United States Patent [19]

Minegishi et al.

[11] 4,104,609
[45] Aug. 1, 1978

[54] FISH-FINDER

[76] Inventors: Yukihiko Minegishi, 451-54, Noba-cho, Konan-ku, Yokohama-shi, Kanagawa-ken; Shokichi Sato, 105, 6-2, 2-chome, Fuchinobe, Sagamihara-shi, Kanagawa-ken; Toshikazu Yamada, Sakaeso, 7-20, 3-chome, Ichikawa, Ichikawa-shi Chiba-ken, all of Japan

[21] Appl. No.: 797,145

[22] Filed: May 16, 1977

[30] Foreign Application Priority Data

| May 19, 1976 | [JP] | Japan | 51-57676 |
| May 19, 1976 | [JP] | Japan | 51-57677 |
| Nov. 17, 1976 | [JP] | Japan | 51-138029 |

[51] Int. Cl.² ........................... G01S 9/70; G01S 7/62
[52] U.S. Cl. ................................... 340/3 C; 340/3 T; 343/5 CD
[58] Field of Search ............. 340/3 C, 3 T; 343/5 CD

[56] References Cited

U.S. PATENT DOCUMENTS

| 3,614,720 | 10/1971 | Ludlum | 340/3 C |
| 3,617,997 | 11/1971 | Maass et al. | 343/5 CD |
| 3,711,822 | 1/1973 | Muller | 343/5 CD |
| 3,792,194 | 2/1974 | Wood et al. | 340/3 C |
| 3,845,462 | 10/1974 | Blue | 340/3 C |

*Primary Examiner*—Richard A. Farley

[57] ABSTRACT

In a fish-finder of the type emitting ultrasonic pulses into the water and receiving and displaying the reflected waves, the received reflected waves are converted into digital signals corresponding to their levels and written into a main memory as information of one display line of a color cathode ray tube display. The main memory has a capacity of storing information of one picture frame of the color cathode ray tube display, and is read out repeatedly. The read-out signals are converted into color signals according to their levels and the color signals are supplied to the color cathode ray tube. Every time a new reflected wave is written into the main memory, the stored content of the main memory is partly removed so that the oldest display on the screen may disappear and, at the same time, the display on each display line is shifted to the older display line.

21 Claims, 28 Drawing Figures

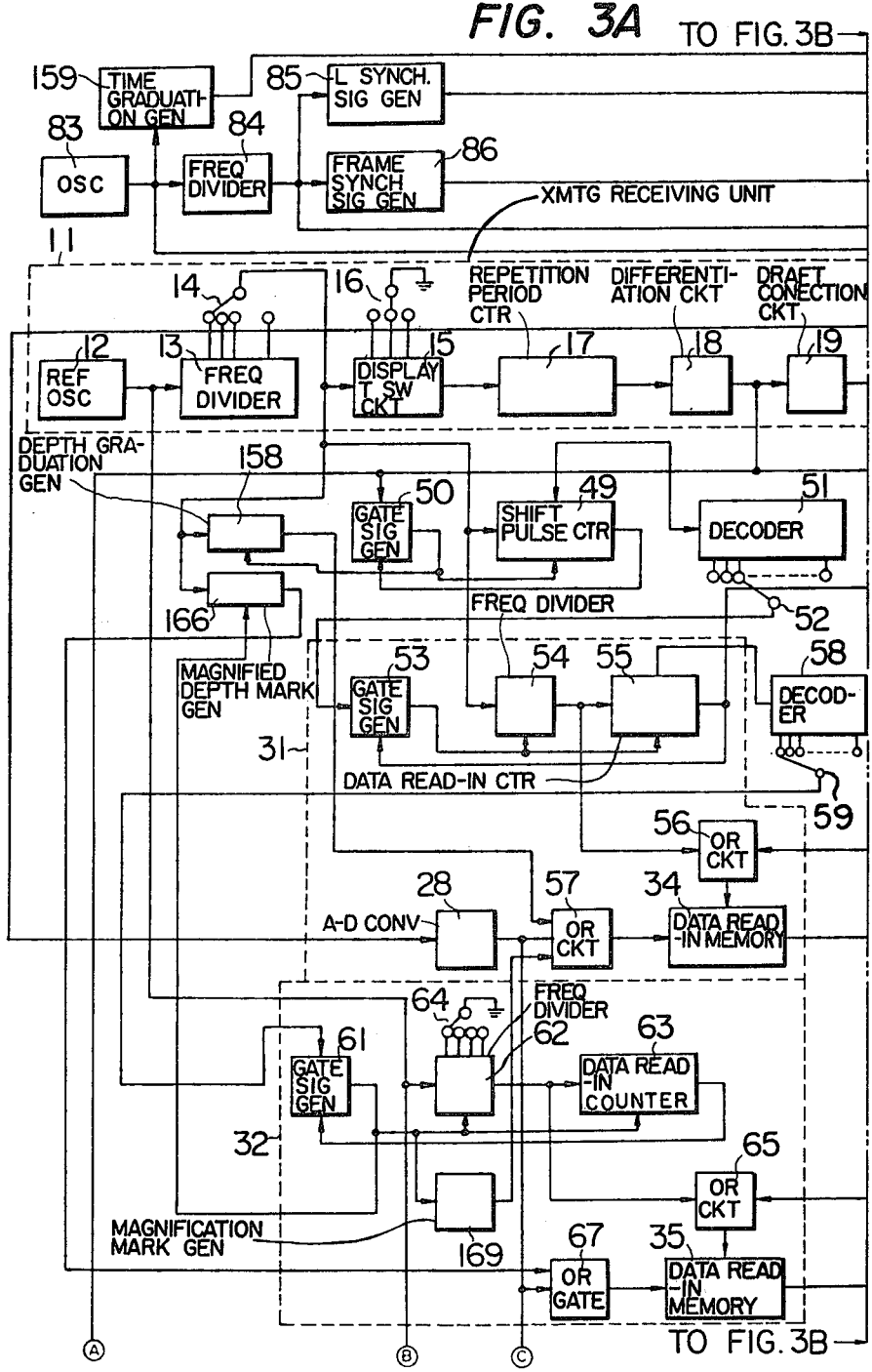

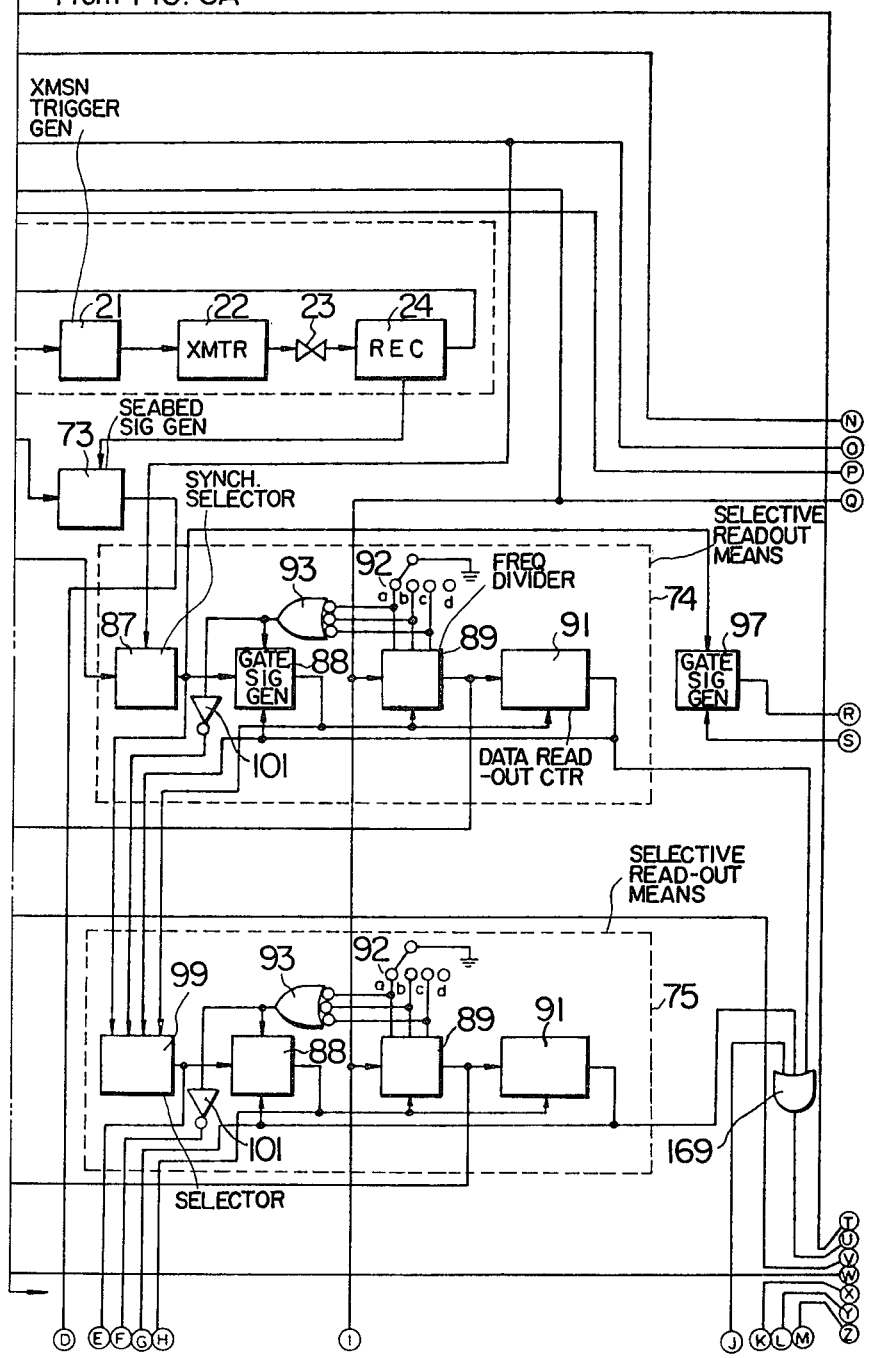

| B4 | B3 | B2 | B1 | R2 | R1 | G2 | G1 | B2 | B1 | |
|----|----|----|----|----|----|----|----|----|----|----|
| 0 | 0 | 0 | 0 | 0 | 0 | 0 | 0 | 1 | 0 | BLUE |
| 0 | 0 | 0 | 1 | 0 | 0 | 0 | 1 | 1 | 0 | |
| 0 | 0 | 1 | 0 | 0 | 0 | 1 | 0 | 0 | 1 | |
| 0 | 0 | 1 | 1 | 0 | 0 | 1 | 0 | 0 | 1 | GREEN |
| 0 | 1 | 0 | 0 | 0 | 0 | 1 | 0 | 0 | 0 | |
| 0 | 1 | 0 | 1 | 0 | 1 | 1 | 0 | 0 | 0 | |
| 0 | 1 | 1 | 0 | 1 | 0 | 1 | 0 | 0 | 0 | YELLOW |
| 0 | 1 | 1 | 1 | 1 | 0 | 0 | 1 | 0 | 0 | |
| 1 | 0 | 0 | 0 | 1 | 0 | 0 | 0 | 0 | 0 | RED |

# FISH-FINDER

BACKGROUND OF THE INVENTION

This invention relates to a fish-finder which detects a school of fish by emitting ultrasonic waves into the water and displaying the reflected waves on the screen of a cathode ray tube.

In conventional types of fish-finders, upon emission of ultrasonic waves, a recording pen, initially placed on a recording paper, is driven to run across the recording paper travelling in its lengthwise direction and received reflected waves are supplied to the recording pen to discolor the recording paper in accordance with the levels of the received reflected waves to record shaded images. With the method using such a recording paper, small differences of shading do not appear, so that the amount of information to be displayed is small. Where the level difference of the reflected waves is not large as, for example, in the case of fish in a shoal of plankton, the object to be detected cannot be distinguished from the surroundings. For the same reasons, it is impossible, of course, to judge the kind of fish from the records on the recording paper. Also, it is difficult to discern a school of fish close to the bottom of the water from the recorded images obtained on the recording paper. In the conventional fish-finders, the amount of information of the images recorded on the recording paper is remarkedly smaller than the information of the received reflected waves, as described above. Further, it is also difficult to magnify one part of the record and display it along with the non-magnified record. In some cases, it is desired to magnify one part of the record on the basis of, for example, the seabed. If related information, for example, the information from the fish-finder and that from a net monitor, are recorded side by side, the information can be analyzed more accurately. With the prior art, however, it is relatively difficult to record a variety of information at the same time. Further, it is more difficult to arrange the conventional fish-finder so that it may be freely switched for the operation of a plurality of signals and recording one of them over the entire width of the recording paper and for the operation of recording two or more of the signals in side-by-side relation. Moreover, it is difficult to adjust the relative positions of a plurality of parallel records, so that interrelationships of the records cannot be judged with ease. In the conventional fish-finders of the abovesaid type, recording papers are expendables and it is necessary to prepare a sufficient amount of recording paper at all times.

An object of this invention is to provide a fish-finder in which received reflected waves are displayed clearly in distinction from one another even if they have small level differences.

Another object of this invention is to provide a fish-finder in which a magnified display and a high-speed display can be easily provided.

Another object of this invention is to provide a fish-finder in which a variety of information displays such as a magnified display, a normal display, a display of information from a net monitor, etc. can be provided side by side and these displays can be selectively provided.

Another object of this invention is to provide a fish-finder in which a plurality of information can be displayed in parallel and the relative positions of the displays can be easily changed to facilitate an easy interpretation of their relationships.

Still another object of this invention is to provide a fish-finder which does not employ a recording paper and does not require any articles of consumption.

SUMMARY OF THE INVENTION

In accordance with this invention, ultrasonic pulses are emitted into the water, and reflected waves are converted by a transducer into electric signals and the converted electric signals are stored in a main memory. The main memory has a capacity of storing information of one picture frame of a color cathode ray tube display, and is repeatedly read out and the read-out output is supplied to the color cathode ray tube display through a color converter which generates a color signal according to the output level. On the screen of the color cathode ray tube display, for instance, display lines similar to individual recording lines on the conventional recording paper are formed side by side, for example, in a vertical direction, and arranged in a laterial direction and the information in the main memory is displayed in the form of visual images on such a screen. The aforesaid received reflected wave information is written in the main memory so that it is displayed in the form of one display line at the latest display position on the screen. The main memory is so constructed that every time the latest information is written therein, the information stored until then is sequentially shifted to the older display position and the information on the oldest display line is removed. Accordingly, a display similar to the record on the prior art recording paper appears on the screen of the color cathode ray tube and the display is shifted in the direction of older information, that is, the display is provided as if a recorded recording paper is being shifted.

The repetitive period of the ultrasonic pulse emitted into the water is obtained by dividing the output frequency of a reference oscillator and the received reflected signal converted into a digital form is written first in a normal display data read-in memory, the capacity of which is selected equal to the number of picture elements of one display line of the display at all times. Accordingly, the speed for writing in the above data read-in memory is changed in accordance with the setting of a range switch for selecting the detection range to be displayed. Further, the frequency-divided pulses set by the range switch are counted and the count value is decoded to provide pulses which are sequentially delayed for a predetermined period of time. Any one of the pulses is selected by a shift switch and, from the output set by the shift switch, data are written in the normal display data read-in memory by the frequency-divided pulse set by the range switch. In this manner, the so-called shift switching is accomplished. For example, if the range switch is set to the range of 0 to 1000 m and if the shift switch is set to 0, received signals from the range of 0 to 1000 m are written in the memory. In this case, if the shift switch is set to 1, received signal from the range of 100 to 1100 to 1100 m are written in the memory and if the shift switch is set to 2, received signals from the range of 200 to 1200 m are written in the memory.

For providing a magnified display of one part of the detection range, the received signal range is divided into a plurality of parts and the starting position of a desired one of them is selected by the setting of a magnified position selecting switch. On the basis of the selected position, the abovesaid digital signal is written in a magnified display data read-in memory at a speed at least several times higher than the speed for writing in the aforementioned normal display data read-in memory. By transferring the content of the magnified display data read-in memory to the main memory in a manner to form one display line on the display screen, a partly magnified display is provided. A write pulse for the magnified display data read-in memory is also obtained by frequency dividing the output from the abovesaid reference oscillator and, by changing the frequency dividing ratio by setting of a magnification width selecting switch, the magnifying power on the display screen can be altered.

The abovesaid digital signal is written in a bottom magnified display data read-in memory at a speed at least several times higher than the speed for writing in the normal display data read-in memory and a reflected signal from the bottom of the water is selected from the received reflected signals, and by this output, that is, the so-called bottom signal, writing in the bottom magnified display data read-in memory is stopped. The capacity of this memory is selected equal to the number of picture elements of one display line and excess data accompanying the high-speed writing are overflown, ensuring that the bottom signal is always stored in the abovesaid memory at a predetermined position. The content of this memory is transferred as information of one display line to the main memory, by which the bottom of the water is displayed as a reference straight line and the vicinity of the bottom of the water is displayed on a magnified scale.

The state in the water right under a fishing boat is thus detected by the fish-finder and, in some cases, the state in the vicinity of the opening of a fishing net towed by the boat is monitored by a net monitor mounted on the net. That is, ultrasonic waves are emitted from the net monitor upwardly and downwardly thereof to detect the states in the water above and below the net monitor in the same manner as described above and the received signals are transmitted to the fishing boat for monitoring thereon. The received signals are also converted into digital signals and then written in a net monitor data read-in memory. This writing is achieved in synchronism with writing of data in the fish-finder or data transfer to the main memory and the content of the net monitor data read-in memory is transferred as information of one display line for providing a display on the color cathode ray tube display.

It is possible not only to display information on the display by transferring the content of a selected one of the abovesaid various data read-in memories, but also to display two or more of these data in side-by-side relation. To this end, selective read-out means is provided corresponding to each data read-in memory, and has a selection switch for a full width display, a ½ width display and a ¼ width display. By the setting of the selection switch, read pulses are produced which have speeds twice and four times as high as the speed for the full width display. For example, when the selection switch is set for the ½ width display, the normal display data read-in memory is read out, and the both read outputs are written in a buffer memory at substantially the same speed as the read-out pulse in the case of the full width display. Consequently, the content of the normal display data read-in memory and the content of the partly magnified display data read-in memory are written in the first half and the second half of the buffer memory, respectively. The content of the buffer memory is transferred as the information of one display line to the main memory. Accordingly, a normal display is provided on the upper half of the screen and one part of the display is provided in the lower half on a magnified scaled. In the respective selective read-out means, selecting circuits are provided, and interconnected in cascade. The selecting circuits are each supplied with a start signal from the preceding state to start a read pulse generator of the selective read-out means. Upon completion of reading out of the data read-in memory corresponding to the selective read-out means, the read output is sent as a start signal to the next stage and, in the case where the selective read-out means is not selected, the start signal from the preceding stage is passed to the stage following the non-selected selective read-out means. In this way, a priority circuit is constituted by the cascade connection of the selecting circuits and when one of the data read-in memories is read out, the next selected data read-in memory is automatically read out.

The main memory can be formed with, for instance, shift registers. The content of one of the abovesaid data read-in or buffer memories is written in the main memory as the information of one scanning line of the display, by which one display line can be displayed with one scanning line of the display, or one display line can also be displayed in the form of an alignment of the picture elements of the same position on the respective scanning lines of the display. When the output from the main memory is supplied to the color cathode ray tube display, the output is applied to a color matrix circuit for converting it into a color signal corresponding to the digital signal value. In this case, if a predetermined level or levels in the digital signal are selectively removed before the memory output is applied to the color matrix circuit, components unnecessary for observation are eliminated, thereby to provide a display which is easy to observe.

Further, it is possible to display, on the screen of the display, markers indicative of the depth of water, magnified position markers indicative of a magnified part and time indications. The detection signal from the net monitor and that from the fish-finder are deviated in their detecting position from each other, but received at substantially the same time. Where these signals are displayed side by side, the displays are rather easy to interpret if these displays are spaced apart corresponding to the distance between the actual detecting positions. From this point of view, a buffer memory is provided for the detection signal from the net monitor separately of the buffer memory for the fish-finder. And when the content of the buffer memory for the fish-finder is transferred to the main memory, the content of the buffer memory for the net monitor is written in the main memory in synchronism with the scanning line of the display after being delayed for a time corresponding to the time necessary for the fishing boat to sail the distance between the transmitting-receiving transducer of the fish-finder and the net monitor. In this case, for example, in the former buffer memory, data is stored only in its first half and, in the latter buffer memory, data is stored only in its second half. Thus, in the upper half of the screen of the display, a normal display is provided and in the lower half, the display of the net monitor is provided, with its position spaced apart from the normal display in the time-axis direction.

BRIEF DESCRIPTION OF THE DRAWINGS

FIGS. 3A to 5B are block diagrams showing a specific operative embodiment of the fish-finder of this invention;

DESCRIPTION OF THE PREFERRED EMBODIMENTS

Figure 1:
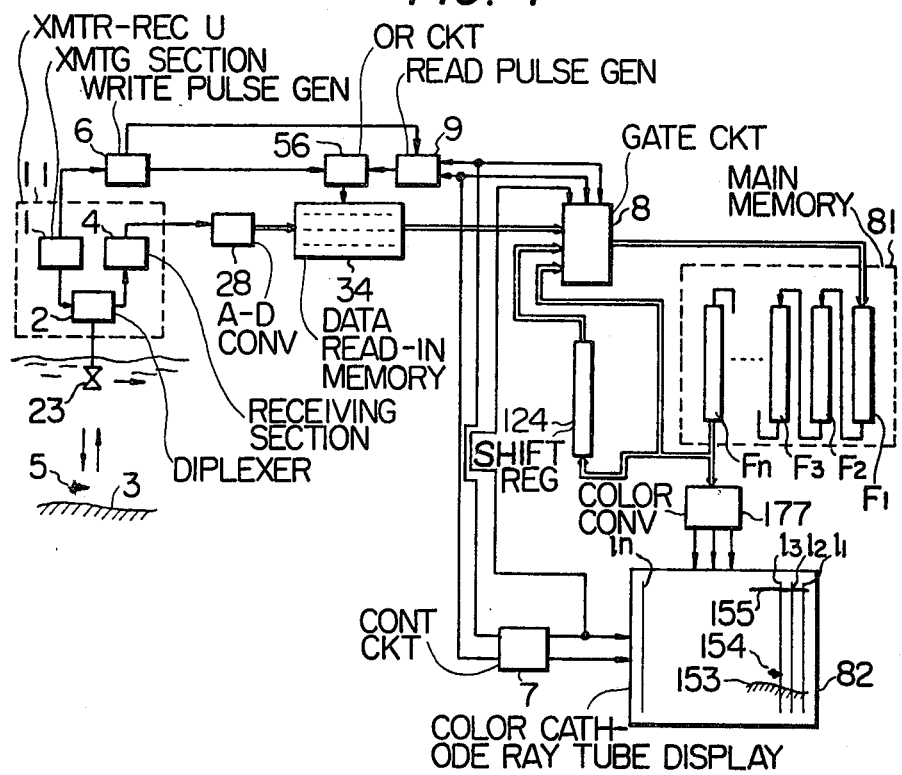
FIG. 1 is a block diagram schematically illustrating a fish-finder of this invention.
Figure 2:
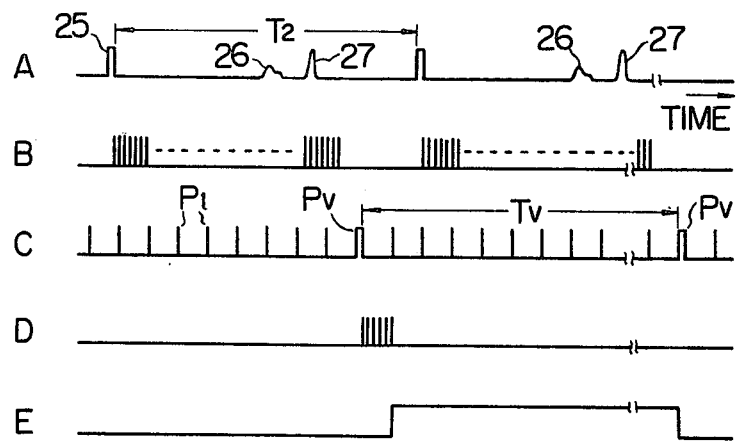
FIGS. 2A to 2E are waveform diagrams explanatory of the operation of the fish-finder shown in FIG. 1.

As shown in FIG. 1, a transmitting-receiving tansducer 23 is excited, with a constant period, by a transmitting section 1 of a transmitter-receiver unit 11 of a fish-finder through a diplexer circuit 2 and, as a result of this, ultrasonic pulses from the transmitting-receiving transducer 23 are emitted towards the sea bottom 3. The reflected waves from the seabed 3 are received by the transmitting-receiving transducer 23, and applied to a receiving section 4 through the diplexer circuit 2. The received signal is composed of a transmitted pulse 25, a reflected signal 26 from a school of fish 5 and a reflected signal 27 from the sea bottom 3, as depicted in FIG. 2A. This received signal is converted by an A-D converter 28 into, for example, a 4-bit digital signal, which is written in a data read-in memory 34. The data read-in memory 34 is, for instance, a shift register, in which the same number of digital signals are parallel bit outputs from the A-D converter can be written simultaneously. This writing is accomplished by applying a write pulse (FIG. 2B) to the memory 34 through an OR circuit 56, which write pulse is produced by a write pulse generator 6 from a signal of an oscillator (not shown) of the transmitting section 1.

A color cathode ray tube display 82 is provided, the screen of which is scanned by an electron beam under the control of a line synchronizing signal and a frame synchronizing signal from a cathode ray tube control circuit 7. A read signal from a main memory 81 is supplied to the display 82 through a color converter 177. The main memory 81 is formed with, for instance, shift registers $F_1, F_2 \ldots F_n$, and has a capacity of storing information of one picture frame of the screen of the display 82. To facilitate better understanding of this invention, the shift registers $F_1, F_2 \ldots F_n$ making up the main memory 81 are described to correspond to scanning lines $l_1, l_2 \ldots l_n$ on the screen of the display 82, respectively, and these shift registers are sequentially connected in cascade. At a certain moment, digital information in the shift registers $F_1, F_2 \ldots F_n$ is displayed on the scanning lines $l_1, l_2 \ldots l_n$. The poststage output from the shift register $F_n$ is supplied to the color converter 177 and, at the same time, fed back to the first stage of the shift register $F_1$ through a gate circuit 8. The shift speed is selected so that the period of one circulation may be the same as the surface scanning period of the display 82. In this state, the content of the main memory 81 is displayed in the form of a still picture on the display 82. Each of the shift registers $F_1$ to $F_n$ is capable of storing a digital signal of parallel four bits. The color converter 177 performs of color conversion for displaying a predetermined color on the display 82 in accordance with the digital signal supplied to the color converter 177, that is, the level of the input digital signal thereto, and red, green and blue electron guns of the color cathode ray tube display 82 are controlled by the output from the color converter 177.

In the transmitter-receiver unit 11, a received signal for one transmitted pulse is read in the data read-in memory 34 and a signal in the memory 34 is transferred as information of one display line to the main memory 81. This new signal is displayed on the display 82 at a predetermined position. For example, in FIG. 1, the latest signal is displayed on the first scanning line $l_1$. The data read-in memory 34 has the same capacity as each of the shift registers $F_1$ to $F_n$ of the main memory 81. Upon completion of writing data in the memory 34, a signal indicative of the completion is applied to a read pulse generator 9. The read pulse generator 9 is supplied which a surface synchronizing signal Pv and a line synchronizing signal Pl, shown in FIG. 2C, from a control circuit 7. The read pulse generator 9 generates read pulses for one line synchronizing signal period from the moment of the surface synchronizing signal immediately after completion of the abovesaid writing, as shown in FIG. 2D. The read pulses are synchronized with shift pulses of the main memory 81, and are equal in number to the write pulses. The read pulses are applied through an OR circuit 56 to the read-in memory 34 to read it out and its output is supplied to the first stage of the shift register $F_1$ through the gate circuit 8. When the signal transfer from the memory 34 to the main memory 81 is completed, the output from the main memory 81 is fed back to the first stage of the shift register $F_1$ through a shift register 124 for providing a delay of one scanning line period. The feedback through the delaying shift register 124 takes place for the period from the moment of completion of reading out of the memory 34 to the moment of arrival of the next frame synchronizing signal as shown in FIG. 2E. When the signal is transferred from the memory 34 to the main memory 81 and applied to the shift register $F_1$, the oldest data stored in the shift register $F_n$ until then is transferred to the delaying shift register 124. Since the time for feedback from the shift register 124 to the main memory 81 is shorter than one frame scanning synchronizing period $T_V$ by one line scanning period, as depicted in FIG. 2E, the abovesaid oldest data is kept in the shift register 124, and removed from the main memory 81.

Every time the data is thus transferred from the memory 34 to the main memory 81, the latest data is displayed on the line-scanning line $l_1$ and the oldest data is eliminated from the main memory. On the screen of the display 82, the data on the display lines are shifted to those of the older data one after another in a direction perpendicular to the display lines, and the second latest data is displayed on the line-scanning line $l_2$. As a result of this, a transmitting track 155 and displays 153 and 154 respectively corresponding to the oscillation pulse 25, the sea bottom 3 and the school of fish 5 are provided on the screen of the display 82. That is, the same display as a record on a recording paper of a conventional fish-finder is obtained and the display moves from right to left in the same manner as in the case where the recording paper is shifted from right to left in FIG. 1. In FIG. 1, if the speed of the received data from the transmitter-receiver until 11 and the scanning speed of the cathode ray tube display 82 are suitably selected, it is possible to leave out the data read-in memory 34 and directly write the data from the A-D converter 28 in the main memory 81.

Figure 4A:
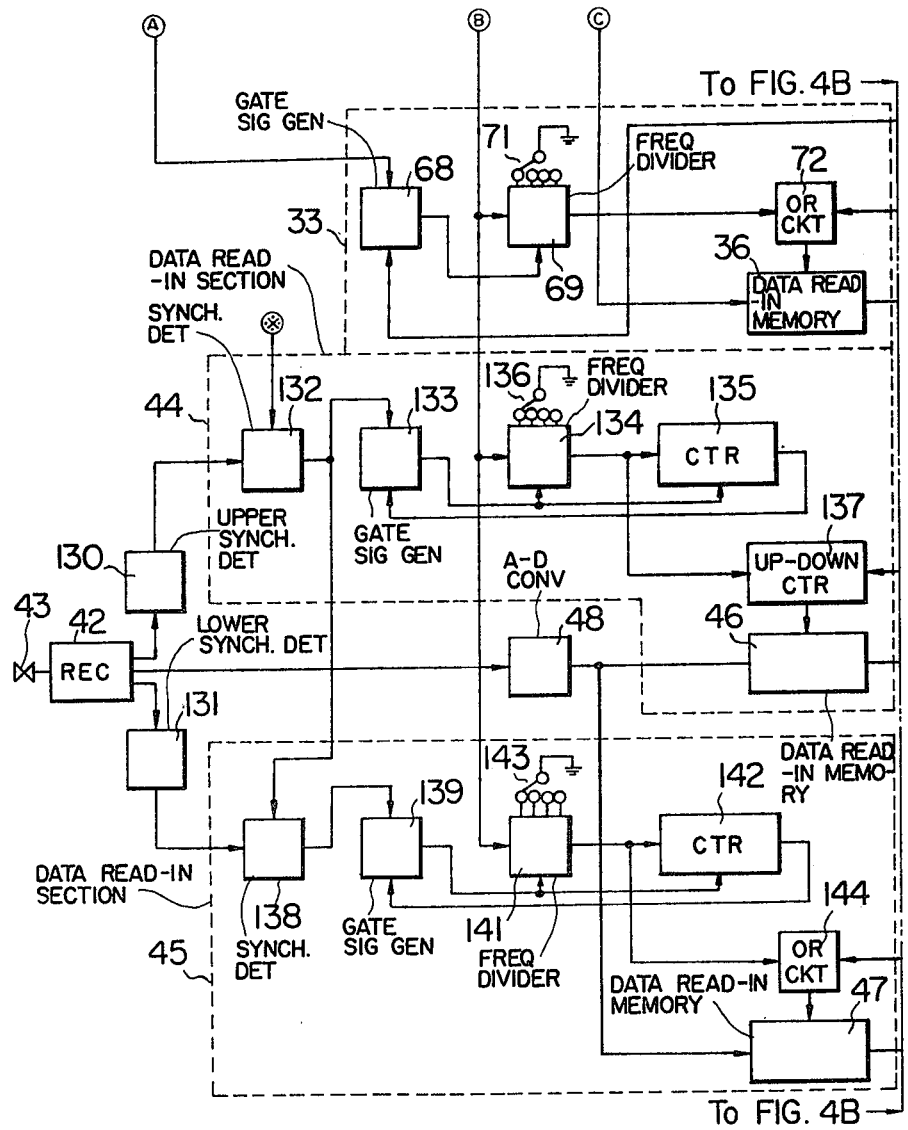
Figure 4B:
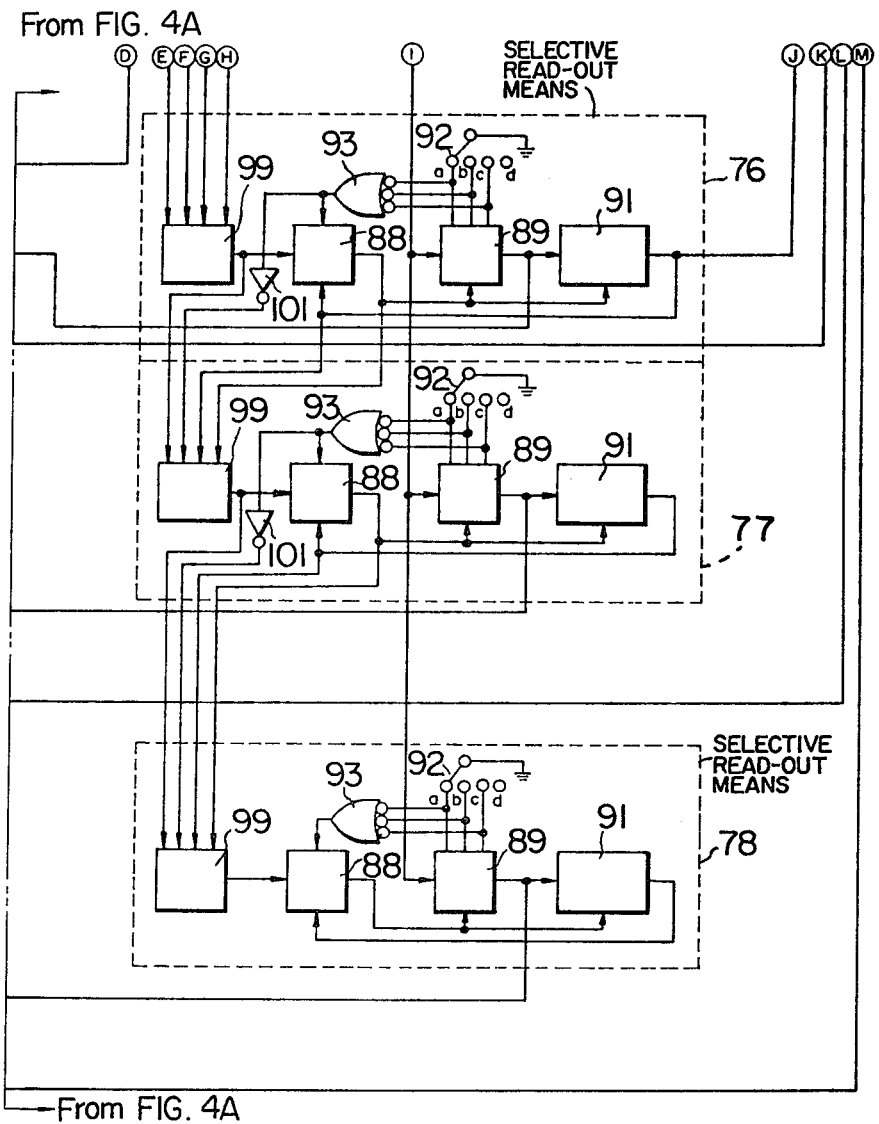
Figure 5A:
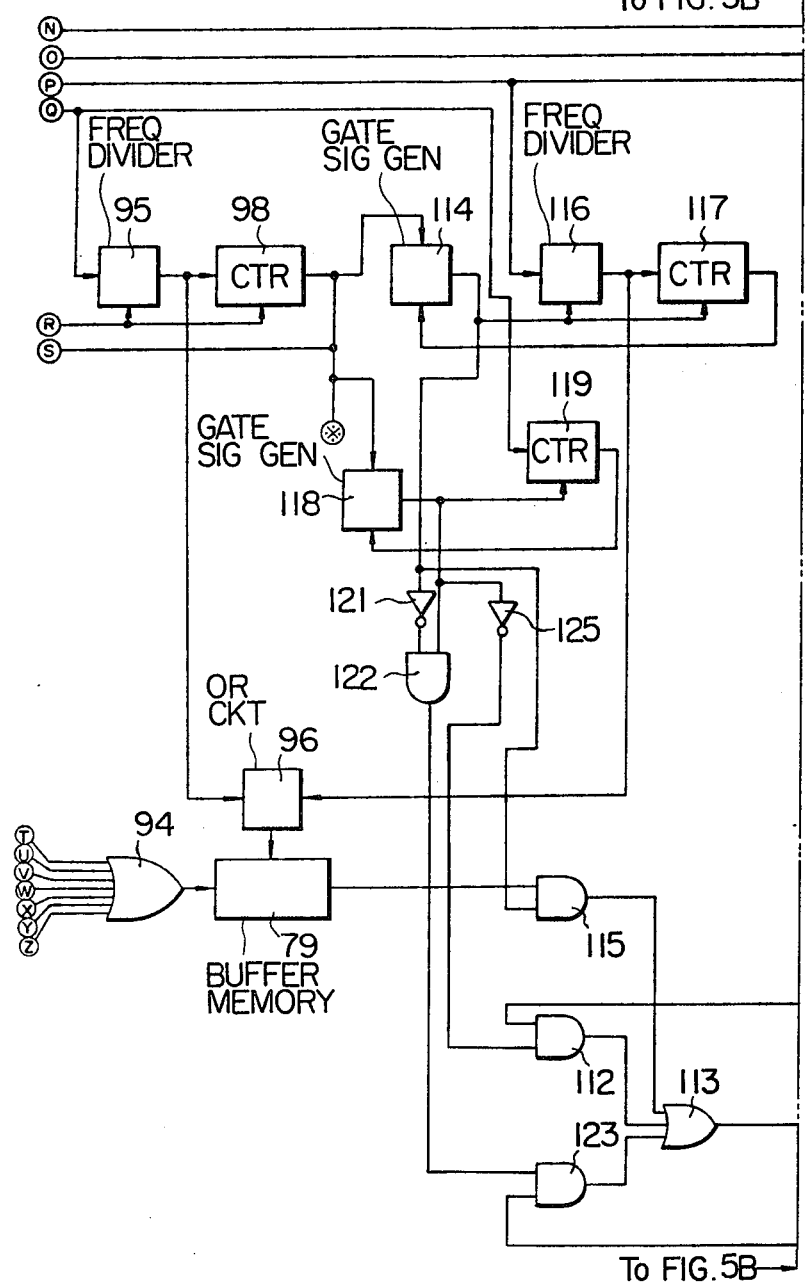
Figure 5B:
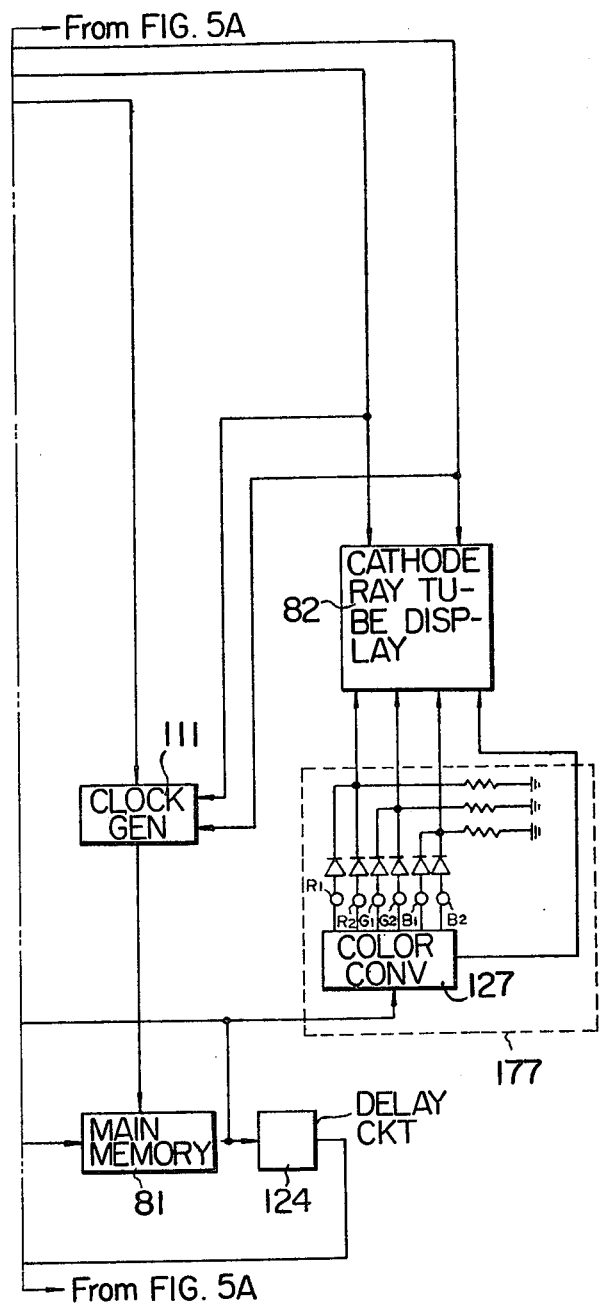

Turning now to FIGS. 3 et sef., the fish-finder of this invention will be further described in detail. FIGS. 3 to 5 illustrate an embodiment of the fish-finder of this invention and the encircled characters at the ends of lead lines in FIGS. 3 to 5 indicate that those of the same characters are respectively interconnected. In FIG. 3, the transmitter-receiver unit 11 is substantially the same as that used in prior art fish-finders. That is, a reference signal from a reference oscillator 12 is frequency divided by a frequency divider 13 for determining the detection range, and its dividing ratio is altered by the selection of a range switch 14. The dividing ratio of the frequency divider 13 is changed depending upon the detection range desired to be adopted, for example, 0 to 100 m, 0 to 200 m, 0 to 400 m, 0 to 800 m or so. As the detection range increases, the frequency dividing ratio is increased to lower the output frequency of the frequency divider 13. The output thus frequency divided is selected by a display time switching circuit 15 to be of any one of, for instance, three frequency dividing ratios; standard, twice and ½. The display time switching circuit 15 is peculiar to the fish-finder of the type employing a cathode ray tube, and has a three-point changeover switch 16. A first one of the switching positions corresponds to a normal display, a second one corresponds to a high-speed display, in which case the output frequency is twice that in the case of the normal display, and a third one corresponds to a low-speed display, in which case the output frequency is ½ of that in the case of the normal display. That is, the time for rewriting the information in the main memory 81 having stored the display information for the cathode ray tube display 82, described later, can be selected by the change-over switch 16 as desired.

Figure 6:
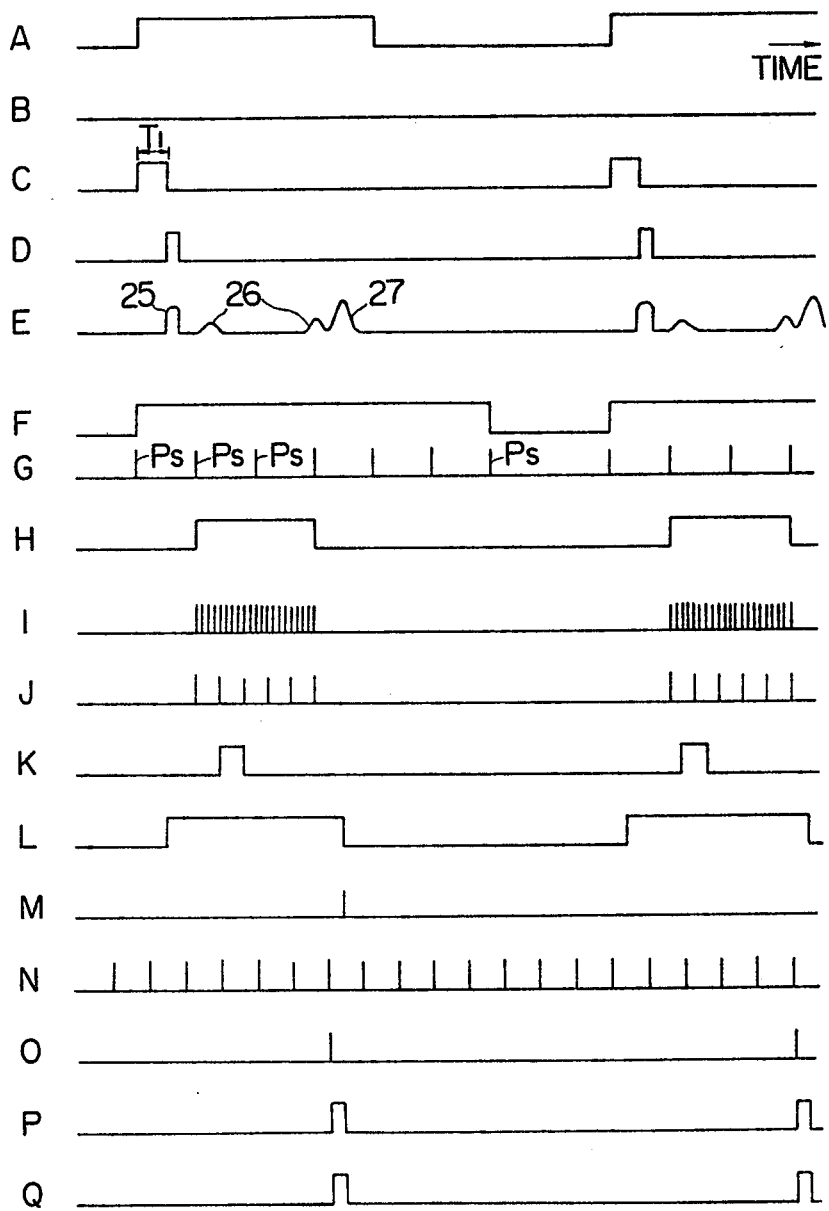
FIG. 6 shows a series of waveform diagrams explanatory of the operation of the embodiment illustrated in FIGS. 3 to 5.

The output from the display time switching circuit 16 is further frequency divided by a repetitive period counter 17 to produce a trigger oscillation period. The output from the repetitive period counter 17 is such, for instance, as shown in FIG. 6A, and this output is differentiated by a differentiation circuit 18 to pick up, for example, its rise pulse (FIG. 6B). This rise pulse is converted by a draft correction circuit 19, for example, a monostable multivibrator, into a pulse which has a pulse width corresponding to the time for propagation of an ultrasonic pulse from the surface of water to the depth of the position where the transmitting-receiving transducer 23 is disposed, that is, a pulse which has a duration $T_1$ shown in FIG. 6C. The converted output is supplied to a transmission trigger generator 21 to derive therefrom a trigger signal such as depicted in FIG. 6D which is delayed behind the differentiated pulse (FIG. 6B) for the time $T_1$.

By the trigger signal thus obtained, a transmitter 22 is driven, the output from which is applied to the transmitting-receiving transducer 23 to excite it, emitting therefrom an ultrasonic pulse towards the sea bottom. The reflected signal of the transmitted ultrasonic pulse is received by the transmitting-receiving transducer 23, and applied to a receiver 24, thus receiving the oscillation pulse 25, the reflected signal 26 from a school of fish and the seabed reflected signal 27. The output from the receiver 24 is converted by an A-D converter 28 into, for instance, a digital signal of parallel four bits, which is supplied to a plurality of data read-in sections.

The data read-in sections are a normal display data read-in section 31, a partly magnified display data read-in section 32 and a seabed magnified display data read-in section 33, and the output from the A-D converter 28 is applied to data read-in memories 34, 35 and 36 of the abovesaid data read-in sections 31, 32 and 33.

Figure 7:
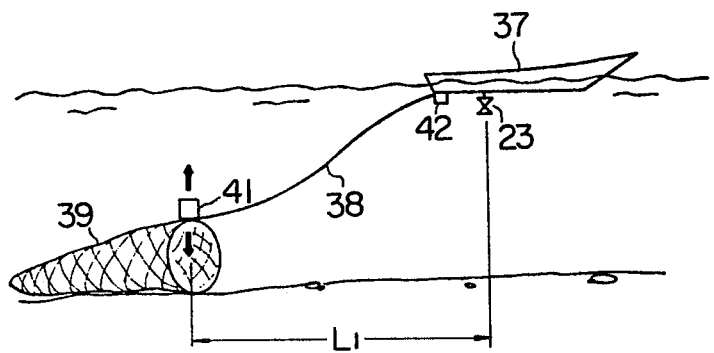
FIG. 7 is a schematic diagram showing the relationship between a fishing boat and a net monitor.

The illustrated embodiment is adapted so that information of a net monitor can also be displayed. As illustrated in FIG. 7, the transmitting-receiving transducer 23 of the fish-finder is disposed on the underside of the bottom of a fishing boat 37 and the ultrasonic wave transmission and reception are achieved in the manner described above. A fishing net 39 is towed through a rope 38 and a net monitor 41 is mounted on the upper side of the fishing net in the vicinity of its opening. Ultrasonic waves are transmitted upwardly and downwardly of the net monitor 41 and the reflected waves are received. The received signals are transmitted to the fishing boat 37, and received by a receiver 42 mounted thereon, using the ultrasonic wave as a carrier.

That is, in FIGS. 3 to 5, the signal from the net monitor 41 is received by a receiving transducer 43 of the receiver 42. Upper and lower detection signal portions in the received signal are separated from each other by data read-in sections 44 and 45. Their data read-in memories 46 and 47 are each supplied with the received signal from the receiver 42 after it is converted by an A-D converter 48 into a digital signal.

In the normal display data read-in section 31, a gate signal generator 50 is driven by the pulse from the differentiation circuit 18 to generate a gate signal, as depicted in FIG. 6F. Under the control of this gate signal, a shift pulse counter 49 starts a counting operation to count the output pulses from the frequency divider 13 for the detection range. The count value of the counter 49, is decoded by a decoder 51 and output terminals of the decoder 51, which have proper intervals, are selected by a shift selection switch 52. Fixed terminals of the shift selection switch 52 on the side of the decoder 51 are arranged to provide such pulses Ps as shown in FIG. 6G which are sequentially phased apart, for instance, by 50 m in terms of the distance of detection by the ultrasonic wave. One of the pulses Ps is selected by the shift selection switch 52, and applied to a gate signal generator 53 to drive it, generating a gate signal as depicted in FIG. 6H. For example, where the second pulse is selected by the switch 52 in the state that the range switch 14 is set for the detection range of 0 to 100 m, range from 50 to 150 m below the surface of the water is detected. The shift pulse counter 49 is so constructed as to provide a time interval corresponding to the distance of at least one shift, in this example, 100 m, from the moment of the counter 49 having counted a predetermined number of pulses to reach its full count to the moment of generation of the next trigger pulse. By the full count output from the shift pulse counter 49, sending of the gate signal from the gate signal generator 50 is stopped and its output drops to the lower level as shown in FIG. 6F, stopping the counting operation of the counter 49. The gate signal generator 50 is, for example, a flip-flop circuit, and is set by the output from the differentiation circuit 18 and reset by the output from the counter 49. The other gate signal generators in the circuit are also constructed as is the case with the gate signal generator 50.

When the output from a gate signal generator 53 rises up to the higher level, a frequency divider 54 and a data read-in counter 55 become operative. In the frequency divider 54, the output from the frequency divider 13 is further frequency divided and the frequency-divided output is counted by the data read-in counter 55. Further, the output from the frequency divider 54 is applied through an OR circuit 56 to the data read-in memory 34 and, at every application thereto of the pulse, the output from the A-D converter 28 is written in the memory 34 through an OR circuit 57. The counter 55 reaches its full count with the number of picture elements of one display line in the display 82, for instance, 256. By the output from the counter 55, the gate signal generator 53 is controlled to drop its output to the lower level, stopping the operations of the frequency divider 54 and the counter 55. That is, the frequency divider 54 generates a data read-in pulse such as is shown in FIG. 6I, and the data read-in memory 34, for instance, a shift register, and reads in the data of 256 picture elements.

In the partly magnified display data read-in section 32, for providing a magnified display by selecting a desired period during the operation of the counter 55, that is, while the data is read in the normal display data read-in section 31, the count content of the counter 55 is supplied to a decoder 58 and one of its output terminals is selected by a magnified position selection switch 59. For example, the period of the output gate signal from the selection gate signal generator 53 is equally divided into five, and pulses which are sequentially displaced apart in phase respectively corresponding to the five periods, are obtained at five fixed terminals of the selection switch 59, as depicted in FIG. 6J, and one of the pulses is chosen by the switch 59. By the selected pulse, the output from a gate signal generator 61 is raised to the higher level as shown in FIG. 6K and, is applied to a frequency divider 62 and a data read-in counter 63 to put them in operation. The frequency divider 62 is supplied with the output pulse from the reference oscillator 12. The frequency dividing ratio of this frequency divider 62 is changed by a magnification width selection switch 64. When the magnification width is large, that is, when the magnifying power is large, the abovesaid frequency dividing ratio is selected small to produce a high-frequency output. The output pulses from the frequency divider 62 are counted by the data read-in counter 63 and, at the same time, applied through an OR circuit 65 to a data read-in memory 35 to drive it, with the result that the output from the A-D converter 28 is read in the memory 35 through an OR gate 67.

The counter 63 reaches its full count with, for example, 256 bits as is the case with the counter 55 and, by its full count output, the gate signal generator 61 is controlled to lower its output to the lower level, putting the frequency divider 62 and the counter 63 out of operation. Thus, the A-D converted output of the received signal corresponding to the higher level of the output from the gate signal generator 61 (FIG. 6K) is read in the memory 35, as 256 pieces of sampled information, that is, as the picture element information of one display line.

In the seabed magnified display data read-in section 33 (FIG. 4A), a gate signal generator 68 is driven by the differentiated pulse from the differentiation circuit 18, shown in FIG. 6B, and the output signal from the gate signal generator 68 (FIG. 6L) is applied to a frequency divider 69 to make it operative. The frequency divider 69 frequency divides the reference signal from the oscillator 12 and the frequency dividing ratio of the frequency divider 69 is altered in accordance with the magnifying power set by a magnification width selection switch 71. In the case of a large magnification, the frequency dividing ratio is selected small to produce a high frequency pulse, as is the case with the frequency divider 62. The output from the frequency divider 69 is applied through an OR circuit 72 to the data read-in memory 36 to drive it to read therein the output from the A-D converter 28 at each application of the output pulse from the frequency divider 69. The memory 36 has the same capacity as the memories 34 and 35, so that it reaches its full count with 256 pulses, and every time the latest data is further written in the memory 36, the data stored until then disappears in the order in which it was written in the memory.

On the other hand, the output from the receiver 24 is also applied to a seabed signal detector 73 (FIG. 3B), which may be a known one. The seabed signal detector 73 detects, as a seabed signal, for instance, a signal higher than a predetermined level in the time interval between transmission of two oscillation pulses. This seabed signal is a pulse such as shown in FIG. 6M, by which the gate signal generator 68 is controlled to drop its output to the lower level to stop the operation of the frequency divider 69, and hence stop the data read-in operation of the data read-in memory 36. The data thus read in is such that the reflected signal from the sea bottom is the latest. Since such a data read-in operation takes place at all times, the sea bottom always lies at a constant position on the display line and the line of the seabed is displayed in the form of a straight line and the area upwardly of the seabed is displayed on the enlarged scale following the frequency dividing ratio of the frequency divider 69.

For convenience of explanation, the data read-in operations of the data read-in sections 44 and 45 for the net monitor will be described later. The data read into the data read-in memories 34, 35, 36, 46 and 47 of the data read-in sections, as described above, are read into a common buffer memory 79 (FIG. 5A) in accordance with the selected state of selective readout means 74 to 78 provided corresponding to these memories. The data read in the buffer memory 79 is transferred to a main memory 81 (FIG. 5B), repeatedly read out therefrom and applied to the cathode ray tube display 82 on which it is displayed as a picture. The cathode ray tube display 82 is controlled in the following manner: The output signal from an oscillator 83 is frequency divided by a frequency divider 84 to the line (horizontal) scanning period of the cathode ray tube display 82 and the frequency-divided output is supplied to a line synchronizing signal generator 85, the output from which is applied to the display 82. Further, the output from the frequency divider 84 is supplied to a frame (vertical) synchronizing signal generator 86 to derive therefrom a frame synchronizing signal, which is also applied to the display 82. The information corresponding to one display line of the display 82 is stored in buffer memory 79, and transferred to the main memory 81, as described above.

Figure 8:
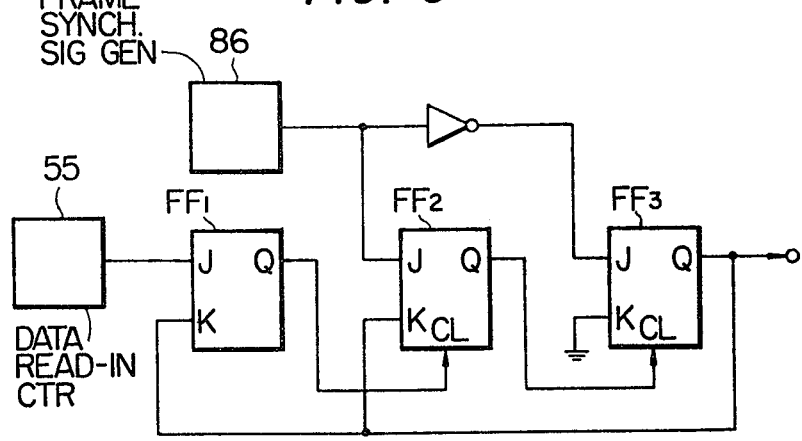
FIG. 8 is a circuit diagram illustrating a specific operative example of a synchronization selecting circuit.

The data transfer from the data read-in section to the buffer memory 79 is achieved on the basis of the clock of the display 82. To this end, the output from the data read-in counter 55 and the output pulse from the frame synchronizing signal generator 86 are supplied to a synchronization selector 87. The frame synchronizing pulse signal is such, for instance, as shown in FIG. 6N, and a frame synchronizing pulse next to the full count output from the data read-in counter 55, that is, next to the trailing edge of the gate signal shown in FIG. 6H, is selected as depicted in FIG. 6O. The synchronization selector 87 is composed of J-K flip-flops, as illustrated in FIG. 8. A write completion signal from the counter 55 is applied to a J terminal of a J-K flip-flop $FF_1$ to raise the output at its Q terminal to the higher level and this output is applied to a clear terminal CL of a J-K flip-flop $FF_2$, by which the flip-flop $FF_2$ is put in its operable state. Since the J terminal of the flip-flop $FF_2$ is supplied with the frame synchronizing pulse from the frame synchronizing signal generator 86, the flip-flop $FF_2$ is set by the frame synchronizing pulse following the abovesaid write completion pulse to raise the output at the Q terminal to the higher level. This output of the higher level is supplied to the clear terminal CL of a flip-flop $FF_3$ to make this flip-flop operable. The J terminal of the flip-flop $FF_3$ is supplied with an inverted pulse of the frame synchronizing pulse and, at its rise, that is, at the trailing edge of the frame synchronizing pulse, the flip-flop $FF_3$ is set. By the output from the flip-flop $FF_3$, the flip-flops $FF_1$ and $FF_2$ are reset to drop the outputs at the Q terminals of the flip-flops $FF_2$ and $FF_3$ to the lower level, deriving from each of the Q terminals a pulse at the position of the trailing edge of the frame synchronizing pulse immediately following the write completion signal.

By the frame synchronizing pulse thus selected, a gate signal generator 88 is driven to derive therefrom a signal such as is shown in FIG. 6P, which is applied to a frequency divider 89 and a data read-out counter 91 to make them operative. The frequency divider 89 is supplied with the line synchronizing signal from the frequency divider 84, and the frequency dividing ratio of the frequency divider 89 is altered by the selection of a display width selection switch 92.

The switch 92 has, for instance, four fixed terminals $a$ to $d$. When the switch 92 is connected to the fixed terminals $a$ to $c$, respectively, the frequency dividing ratio of the frequency divider 89 is ½, ¼ and ⅛, respectively.

When connected to the fixed terminal $d$, the switch 92 is not connected to the frequency divider 89 and this selective read-out means is not selected. NOT outputs from the fixed terminals $a$ to $c$ are supplied to an OR circuit 93, the output from which is applied to the gate signal generator 88 to clear it to hold its output at the lower level. Where the fixed terminal $a$ of the display width selection switch 92 is selected, the data selected are displayed as one display line of the display 82, that is, it is displayed to extend across the screen of the display 82 from one to the other end. When the fixed terminals $b$ and $c$ are selected, the data selected are displayed with widths of ½ and ¼, respectively.

The frequency-divided output from the frequency divider 89 is counted by the counter 91. The counter 91 reaches its full count with 256 pulses as is the case with the data read-in counter 55 and so on. As set forth above, the display width selection switch 92 also performs the function of a switch for determining whether the selective read-out means is selected or not. Where the switch 92 is connected to the fixed terminal $d$, the selective read-out means is not selected and the output from the gate signal generator 88 does not rise to the higher level. When the selective read-out means is selected, however, the switch 92 is connected to any one of the fixed terminals $a$ to $c$ to derive the frequency-divided output from the frequency divider 89 and its output pulses are counted by the counter 91. At the same time, the data read-in memory 34 corresponding to the selective read-out means 74 is driven and the data read out from the memory 34 is applied to the buffer memory 79 through an OR gate 94.

Writing in the buffer memory 79 takes places in synchronism with the latest one of the output pulses from the frequency divider 89. That is, the pulse from the frequency divider 84 is frequency divided down to ⅛ in a frequency divider 95 and its frequency-divided output is applied to the buffer memory 79 through an OR circuit 96 and, by this control, the data from the OR circuit 94 is written in the buffer memory 79. In order to control this writing, the output from the synchronization selector 87 is also applied to a gate signal generator 97 to produce a gate signal as shown in FIG. 6Q, which is applied to the frequency divider 95 and a counter 98 to put them in their operative state. The counter 98 counts the output from the frequency divider 95 and when the counter 98 has counted a predetermined number of the frequency-divided output pulses, in this example, 256 pulses, the gate signal generator 97 is controlled by the output from the counter 98 to drop its output to the lower level.

Selective read-out means 75, 76, 77 and 78 are substantially identical in construction with the abovesaid one 74, and accordingly they each have the gate signal generator 88, the frequency divider 89, the read-out counter 91, the display width selection switch 92 and the OR circuit 93, which are connected in the same manner as set forth above. But a selector 99 is provided in place of the synchronization selector 87. The selectors 99 of the selective read-out means 75 to 78 are sequentially connected in cascade, and the synchronization selector 87 is connected to the stage preceding them. Further, the output from the OR circuit 93 is supplied through an inverter 101 to the selector 99 of the next stage and the output from the counter 91, which is indicative of completion of read, and the output from the gate signal generator 88 are also supplied to the selector 99 of the next stage.

Figure 9:
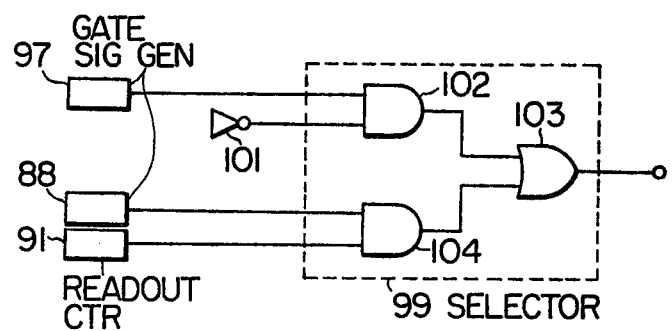
FIG. 9 is a circuit diagram showing an example of a selector.

As illustrated in FIG. 9, when the output from the inverter 101 of the preceding stage has the lower level, namely when the display width selection switch 92 at the preceding stage is connected to any one of the terminals a to c, a gate 102 of the selector 99 is closed, so that the output from the synchronization selector 87 or the selector 99 of the preceding stage cannot pass through the gate 102. However, when the display width selection switch 92 is connected to the terminal d, that is, when the selective read-out means is not selected, the output from the inverter 101 of the selective read-out means has the higher level and the gate 102 opens and, in the case of the selector 99 or the selective read-out means 75 of the preceding stage, a start signal from the synchronization selector 87 is applied to the gate 102 and an OR gate 103 to produce the output from the selector 99.

On the other hand, when the display width selection switch 92 is connected to any one of the terminals a to c, the gate 102 is closed as described above and a gate 104 is opened by the output from the gate signal generator 88 of the previous stage. The last output pulse from the read-out counter 91 is applied to the gate 104 to derive an output from the selector 99. In other words, where the selective read-out means is not selected, the start signal from the preceding stage is applied as a start signal to the following stage and in the case where the display width selection switch 92 is connected to any one of the terminals a to c, the full count output from the read-out counter 91 is applied as a start signal to the next stage.

Figure 10:
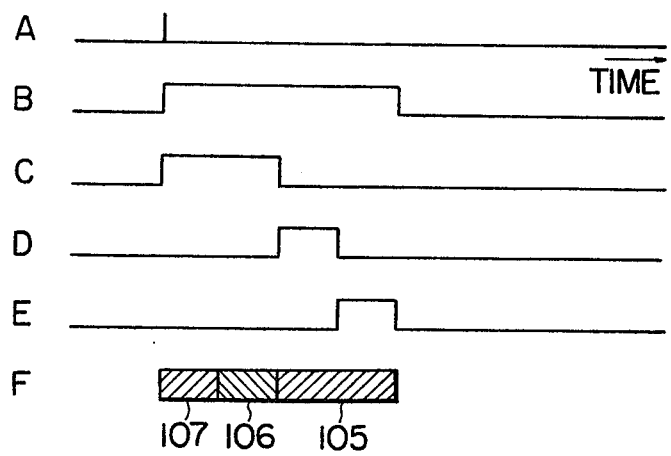
FIG. 10 shows a series of waveform diagrams explanatory of the operation of selective read-out means.

For example, the start signal is produced as shown in FIG. 10A, by which the output from the gate signal generator 88 is raised to the higher level as illustrated in FIG. 10B. Let it be assumed that the selection switch 92 is connected to the terminal a, the frequency dividing ratio of the frequency divider 89 is the largest and that when the read-out counter 91 reaches its full count, the gate signal from the gate signal generator 88 falls as shown in FIG. 10B. Where the display width selection switch 92 is connected to the terminal b, the frequency dividing ratio of the frequency divider 89 is ½, so that its output frequency is twice that in the case of the switch 92 being connected to the terminal a. Accordingly, the output from the counter 91 reaches its full count at a speed twice that in the latter case and the output width of the gate signal generator 88 is ½ that in FIG. 10B, as depicted in FIG. 10C.

Now, let it be assumed that the switch 92 is connected to the terminal b in the selective read-out means 74 and the switch 92 is connected to the terminal c in the selective read-out means 75. Then, the full count of the read-out counter 91 of the preceding stage passes through the gate 104 of the selector 99 of the selective read-out means 75 and the output from the gate signal generator 88 rises as shown in FIG. 10D. Since the frequency dividing ratio of the frequency divider 89 is set at ½, the counter 91 reaches its full count at a speed twice the counting speed of the read-out counter 91 of the selective read-out means 74 at this time and, as a result of this, the output signal from the gate signal generator 88 drops to the lower level as illustrated in FIG. 10D. At the end of this signal, the selective read-out means 76 is driven and if its display width selection switch 92 is set at the terminal c, the gate signal generator 88 produces such a signal as shown in FIG. 10E in the same manner as set forth above.

As described above, the frequency dividing ratio of the frequency divider 95 is selected to be the same as the largest frequency dividing ratio of the frequency divider 89 and the capacity of the counter 98 is equal to that of the counter 91, so that the time for writing in the buffer memory 79 is equal to the duration of the gate signal shown in FIG. 10B which is produced when the selection switch 92 is set at the full width terminal a. Consequently, in the case where the display width selection switches 92 of the selective read-out means 74, 75 and 76 are respectively connected to the terminals b, c and d, the gate signal generators of the selective read-out means 74, 75 and 76 produce the outputs depicted in FIGS. 10C, D and E, respectively, and in these periods, the data in the data read-in memories 34, 35 and 36 are all read out therefrom, and written in the buffer memory 79. The content of the memory 34 is written in the half area of the buffer memory 79 as indicated by 105 in FIG. 10F and the contents of the memories 35 and 36 are respectively written in a quarter area as indicated by 106 and 107. In practice, the memories 34 to 36 and 37 have the same capacity, so that the data written in the buffer memory 79 are skipped at intervals in accordance with the compression ratio adopted in the writing.

The information of one display line of the display 82, thus transferred to the buffer memory 79, is transferred to the main memory 81. The main memory 81 is, for example, a shift register which has a capacity corresponding to one picture frame of the cathode ray tube display 82. The output from the oscillator 83 is applied to a clock generator 111 to provide clock pulses, by which the main memory 81 is shifted. The output from the main memory 81 is applied to the cathode ray tube display 82 and, at the same time, fed back to the main memory 81 through a gate 112 and an OR gate 113. In this embodiment, one scanning line of the cathode ray tube display 82 is employed as one display line. Upon completion of the data transfer from the data read-in sections to the buffer memory 79, the counter 98 reaches its full count and its output (FIG. 11A) is also applied to a gate signal generator 114 to derive therefrom a gate signal, as shown in FIG. 11B. This signal is applied to a gate 115 to open it, permitting the supply of the output from the buffer memory 79 to the main memory 81 through the gates 115 and 113. The gate signal from the gate signal generator 114 is also supplied to a frequency divider 116 and a counter 117 to make them operative. The frequency divider 116 frequency divides the output from the oscillator 83 to obtain a clock signal of the same speed as the clock signal derived from the clock generator 111. The clock signal is applied as a read clock signal to the buffer memory 79 through the OR circuit 96. Accordingly, the read clock signal to the buffer memory 79 and the write clock signal to the main memory 81 are synchronized with each other.

When the counter 117 has counted the picture elements of one display line, in this example, 256 picture elements, it reaches its full count and the gate signal generator 114 is controlled to drop its output to the lower level, stopping the operations of the frequency divider 116 and the counter 117. The output from the counter 98 is also applied to a gate signal generator 118 to raise its output to the higher level, as shown in FIG. 11C, by which output a counter 119 is made operative to count signals of the line scanning frequency from the frequency divider 84. Having counted the number corresponding to scanning lines in one picture frame of the display 82, the counter 119 reaches full count and its output is applied to the gate signal generator 118 to derive therefrom a low-level output to stop the operation of the counter 118. Consequently, there is obtained from the gate signal generator 118 such a high-level output as shown in FIG. 11C which has a duration of one picture frame. In a circuit 122, the abovesaid high-level output is ANDed with the inverted output from an inverter 121 supplied with the output from the gate signal generator 114 shown in FIG. 11B, thus producing a signal depicted in FIG. 11D. The output signal from the circuit 122 is supplied to the gate 123 to open it, by which the output from the main memory 81 is fed back thereto through a delay circuit 124 having a delay time of one scanning line and through the gates 123 and 113.

When new information has thus been applied to the main memory 81 from the buffer memory 79, the latest one of the information stored in the main memory 81 until then is delayed by the delay circuit 124 for period of time corresponding to one scanning line and fed back to the main memory 81. The gate circuit 123 is closed one picture element scanning period after the gate circuit 115 is opened, that is, after information transfer from the buffer memory 79 to the main memory 81 is started. Accordingly, when the information in the buffer memory 79 is transferred to the main memory 81, the oldest information of one display line is transferred to the delay circuit 124, and erased from the main memory 81. The gate circuit 112 is supplied with such a signal as shown in FIG. 11E which is produced by inverting the output from the gate signal generator 118 in an inverter 125 and while no information is transferred from the buffer memory 79 to the main memory 81, only the gate 112 is opened. The clock generator 111 is adapted to be supplied with the frame synchronizing signal and the line synchronizing signal and stop generation of the clock signal in the electron beam flyback period.

Figures 11, 12:
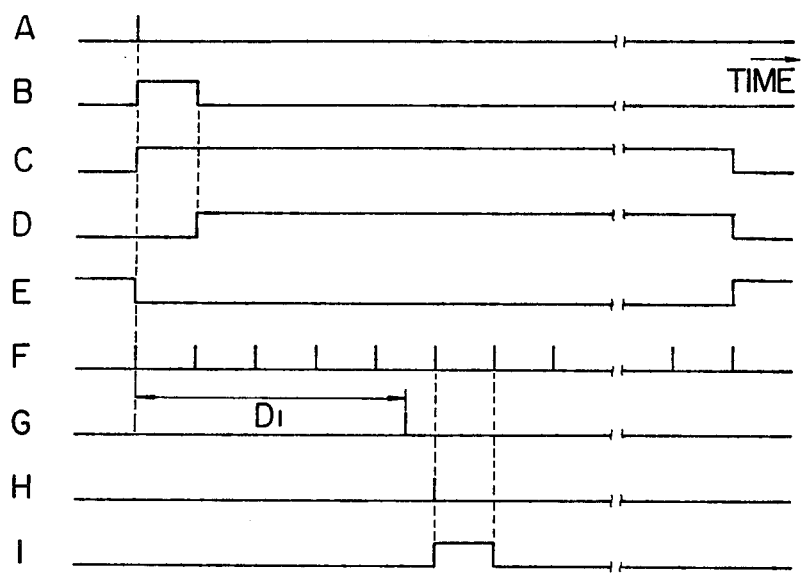
FIG. 11 is a waveform diagram explanatory of the operation of a gate control circuit for a main memory.
FIG. 12 is a diagram showing an example of conversion obtainable with a color matrix circuit.

The cathode ray tube display 82 is a color display, as referred to previously, and the output from the main memory 81 is supplied to a color matrix circuit 127. The color matrix circuit 127 produces a color signal in accordance with the level of input digital information, and has a terminal $R_1$ of an amplitude (intensity) 1 and a terminal $R_2$ of an amplitude 2 for controlling an electron gun which controls a red color of the display 82, a terminal $G_1$ of an amplitude 1 and a terminal $G_2$ of an amplitude 2 for controlling a green color, and a terminal $B_1$ of an amplitude 1 and a terminal $B_2$ of an amplitude 2 for controlling a blue color. In accordance with the input digital information from the main memory 81, an output or outputs are produced at one or two of these six terminals. In order to increase the number of colors to be displayed, each color is controlled for brightness and darkness. That is, the least significant bit of the input digital information is applied to a brightness control terminal of the display 82. The relationships between output 4-bit information $B_4$, $B_3$, $B_2$ and $B_1$ from the main memory 81 and the output terminals of the color matrix circuit 127 are selected as shown in FIG. 12. Such a color matrix circuit 127 can be easily obtained by designing, for example, a diode matrix circuit, in such a manner that the digital input from the main memory 81 produces the outputs which bear the relationships shown in FIG. 12. The brightness of the cathode ray tube is modulated to provide a dark color when the least significant bit $B_1$ is 0 and a bright color when the bit $B_1$ is 1. As a result of this, in the present example, a reflected signal 1111 of a high level from the sea bottom is displayed in red, a non-reflected state 0000 is displayed in blue and a reflected signal 1010 of an intermediate level from a school of fish is displayed in yellow to provide a relatively striking display.

Figure 13:
FIG. 13 is a waveform diagram showing an example of a received signal of the net monitor.

Next, a description will be given in respect of reading of data from the net monitor. As set forth previously with regard to FIG. 7, a time-sharing detection is achieved in connection with the areas above and below the net monitor 41 in the vicinity of the opening of the fishing net 39. For example, as illustrated in FIG. 13, an upper detection period T$u$ and a lower detection period T$l$ appear alternately with each other and, for distinction, the lower detection period T$l$ is selected longer than the upper one T$u$. In the information from the net monitor 41, pulses P$su$ and P$sl$ indicative of information transmitting triggering are produced in the form of negative pulses on one hand and a reflected signal 128 from a school of fish and a reflected signal 129 from the sea bottom are produced in the form of positive pulses on the other hand.

The upper and lower synchronizing pulses P$su$ and P$sl$ are respectively detected by upper and lower synchronization detectors 130 and 131 shown in FIG. 4. Since the detection distance of the net monitor is relatively short, each transmission triggering period is also short. Accordingly, if data from the net monitor 41 are rad after completion of the data transfer on the side of the fish-finder, there is the possibility that the content of the data read-in memory for the net monitor is rewritten before the data from the net monitor are written in the main memory 81. To avoid this, when the output from the counter 98 indicative of completion of the data transfer to the buffer memory 79 is obtained, the synchronizing pulses P$su$ and P$l$ immediately after the abovesaid output are detected and the data following them are read in the data read-in memories 46 and 47, respectively.

In an upper data read-in section 44, the upper synchronizing pulse P$su$ immediately after the output pulse from the counter 98 is detected by a synchronization detector 132, the output from which is applied to a gate signal generator 133 to derive therefrom a high-level output, which is applied to a frequency divider 134 and a counter 135 to render them operative. The frequency dividing ratio of the frequency-divider 134 is changed by a write width setting switch 136 and the frequency divider 134 frequency divides the signal from the oscillator 12 and supplies the frequency-divided output to the counter 135. When having counted 256 picture elements corresponding to one display line, the counter 135 produces an output, which is supplied to the gate signal generator 133 to drop its output to the lower level, stopping the operations of the frequency divider 134 and the counter 135.

The output from the frequency divider 134 is supplied to an up-down counter 137, and counted up. And the output from the A-D converter 48, which converts the output from the receiver 42 for the net monitor 41 into a digital value, is written in the data read-in memory 46 using the content of the up-down counter 137 as an address. The data read-in memory 46 is a so-called random access memory. In the case of reading out data from the memory 46, that is, when the selective read-out means 77 is selected, the output from the frequency divider 89 is counted down by the up-down counter 137 and, by its content, the output from the memory 46 is read out. That is, the readout operation of the data thus written starts with the latest one. In other words, the order of data is reversed. This is necessary for displaying the detection signal of the area above the net monitor such that the more the received information goes away from the oscillation trigger, the more the reflected signal approaches the surface of the sea.

Also in the case of the lower detection data read-in means 45, the lower synchronizing pulse P$sl$, which appears immediately after the upper synchronizing pulse P$su$ when the information following the upper synchronizing pulse P$su$ is written in the memory 46, is detected by a synchronization detector 138, whose output is applied to a gate signal generator 139 to derive therefrom a high-level output, making a frequency divider 141 and a counter 142 operative. The signal from the oscillator 12 is frequency divided by the frequency divider 141, and applied to the counter 142. The frequency dividing ratio of the frequency divider 141 is selected by setting of a switch 143 and the frequency-divided output is applied through an OR circuit 144 to the data read-in memory 47 to drive it and read therein the output from the A-D converter 48.

When the lower detection information has thus been written in the memory 47 and the counter 142 has counted the picture elements of one display line to reach its full count, the output from the counter 142 is applied to the gate signal generator 139 to reduce its output to the lower level and hence stop its operation. The data in the data read-in memory 47 is read out from the selective read-out means 78.

Figure 14:
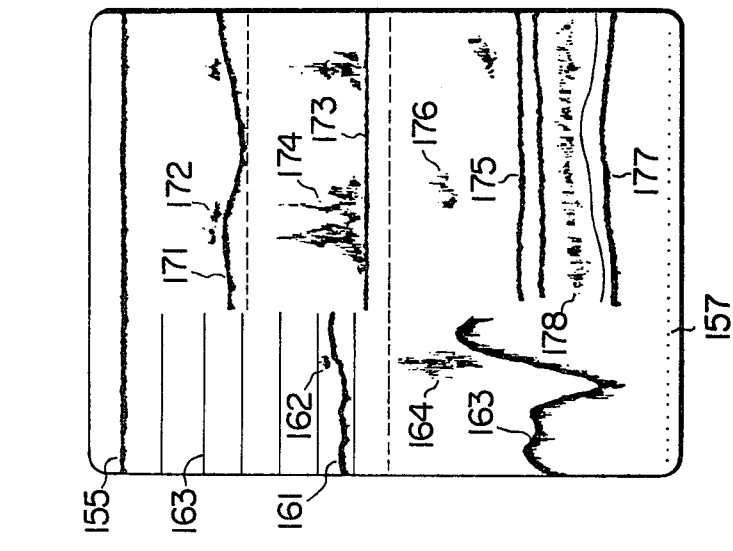
FIGS. 14 and 15 are diagrams respectively illustrating examples of displays provided by the fish-finder of this invention.
Figure 15:
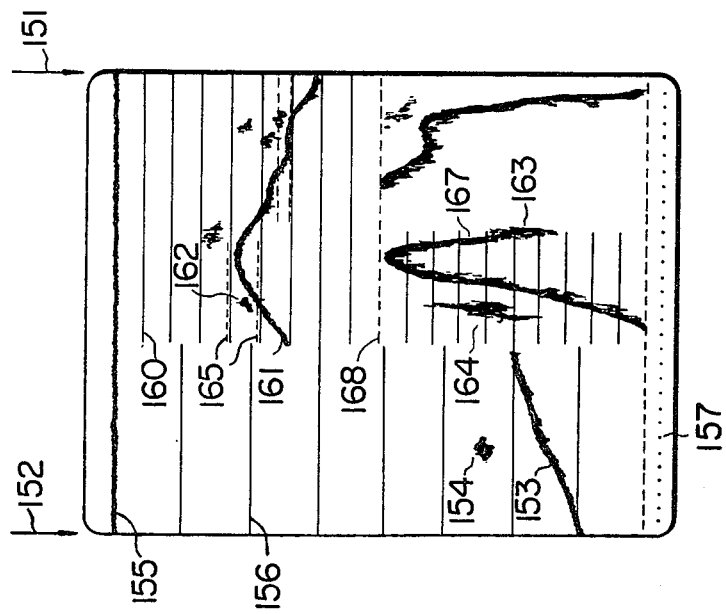

Referring now to FIGS. 14 and 15, a description will be given of the operations for various displays by the fish-finder described above. FIG. 14 shows the case where the line scanning direction of the display 82 is vertical, the latest information is displayed at the rightmost position 151 on the screen and the oldest information at the leftmost position 152. The oldest information displayed in the leftmost position is information thirty minutes before the latest information at the rightmost display position. Thirty minutes before, the range switch 14 was set for 800 m and only the selective read-out mans 74 was selected. In this case, the sea bottom, a school of fish and a transmitting track appear on the screen, as indicated by 153, 154 and 155, respectively. Depth graduations 156 are displayed 100 m apart. At the bottom of the display screen, time graduations 157 are displayed in the form of dots, for examples, two minutes apart.

For providing the depth graduations 156, the output from the frequency divider 13 is supplied to a depth graduation generator 158 in FIG. 3. By the output from a gate signal generator 50, the depth graduation generator 158 is actuated, by which the output from the frequency divider 13 is frequency divided to equally divide the entire display width, that is, one display line, into eight, generating pulses respectively corresponding to the dividing positions. Each of the pulses is read in the data read-in memory 34 through an OR circuit 57 as a numerical value indicative of a predetermined level, for instance, a digital signal of a level indicative of a white level in the case of representing the depth graduation 156 in white level. Accordingly, the information of one display line is stored in the memory 34. For example, in FIG. 3, the rightmost end of the memory 34 corresponds to the uppermost end of the screen of the display 82, that is, the shallowest position of the selected depth range, and the leftmost portion of the memory 34 stores therein the information corresponding to the reflected information from the deepest position of the selected depth range. In the illustrated example, depth graduations of 0 to 800 m are displayed, so that white information indicative of depth graduations 0 m, 800 m and 100 to 700 m is stored at the leftmost and rightmost end of the memory 34 and at positions such that the distance between the both ends of the memory 34 are equally divided into eight, respectively.

Since the time graduations 157 are generated in synchronism with the operation of the display 82, the output from an oscillator 83 is frequency divided by a time graduation generator 159 to produce a digital signal which becomes a white display, for instance, every two minutes. The digital signal is applied through the OR circuit 94 to the buffer memory 79 in which the signal lies at the position corresponding to the lowest end of the display line.

FIG. 14 shows the case where a display of detected information of the range from 0 to 800 m, obtained 19 minutes earlier, and a magnified display of the area from 400 to 500 m of the above detection range are provided in parallel. The selection of the magnified range of 400 to 500 m is achieved by selecting the output from the decoder 58 the magnification value selection switch 59. The magnification width, that is, 100 m, is selected by switch 64. And the selective read-out means 74 and 75 are selected. In these selective read-out means 74 and 75, the display width selection switches 92 are each set at the terminal $b$ so that the abovesaid displays may be provided in the upper and lower portions of the screen of the display 82.

In this case, the information of the range from 0 to 800 m is read, as information of one display line, in the memory 34 as in the case described previously, and the portion for the range between 400 and 500 m is read, as information of one display line, in the memory 35. The content of the memory 34 is compressed by the selective read-out means 74, and written in the first half area of the buffer memory 79, that is, the right half portion in FIG. 5. The content of the memory 35 is read in the latter half area of the buffer memory 79 after compressed. Accordingly, the sea bottom and a school of fish are displayed as indicated by 161 and 162 in FIG. 14 and, at the same time, displayed on a magnified scale, as indicated by 163 and 164, respectively. The depth graduations 154 are compressed as indicated by 160.

Further, the output from the gate signal generator 61, which is indicative of the magnified position, is supplied to a magnification mark generator 169 to produce digital signals corresponding to a color to be displayed (for example, white) at positions corresponding to the rise and fall of the gate signal derived from the gate signal generator 61, and the digital signals are read in the data read-in memory 34 through the OR circuit 57. As a result of this, a magnified position indicating line 165 indicative of the magnified position is displayed to indicate that this portion is displayed on an enlarged scale. Further, the output from the gate signal generator 61 is also applied to a magnified depth mark generator 166 to actuate it. The magnified depth mark generator 166 to freqency divides the output from the frequency divider 13 and, at the same time, generates a depth mark of the magnified display portion. This output is written in the magnification information read-in memory 35 through the OR circuit 67 in the form of a digital signal indicative of the level corresponding to the color to be displayed. As a result of this, a magnified depth mark 167 is displayed on the display 82.

In order to provide a boundary line 168 indicative of the boundary between the normal display in the upper half portion of the display and the magnified display in the lower half portion, the output from the read-out counter 91 of the selective read-out means 74 is written in the buffer memory 79 through an OR circuit 169 and through the OR circuit 94. Similarly, in the case where the selective read-out means 74 and 77 are each selected, the output from the read-out counter 91 of the selected read-out means is applied to the OR circuit 169, and written as a boundary line signal in the buffer memory 79.

Moreover, the present example shows the case where the normal display obtained eleven minutes before is held unchanged and the area between 550 and 600 m is displayed on an enlarged scale by selecting the magnifying switch 64 to magnify the width of 50 m and selecting the magnified position selection switch 59.

FIG. 15 shows the case where a normal display of the area ranging from 0 to 600 m was selected by the selection switch 14 20 minutes before and, thereafter, the area between 500 to 600 m was selected by the magnified position selection switch 59 and displayed by selecting the selective read-in means 74 and 75. In FIG. 15, the seabed display 161 and the display 162 of the school of fish are magnified as indicated by 163 and 164, respectively. The selective read-in means 74, the selective read-in means 76 for the seabed magnification and the selective read-in means 77 and 78 for the net monitor information are selected and their display width selection switches 92 are each set on the terminal c.

Thus, the information of each of the memories 34, 36, 46 and 47 is compressed to ¼ and written in the buffer memory 79 by the operations described above. Consequently, a normal display is provided in the uppermost quarter of the screen to disply the seabed and a school of fish, as indicated by 171 and 172, respectively, and the information from the seabed magnification data read-in section is displayed in the second quarter to provide a display of a straight line 173 indicating sea bottom and a display 174 corresponding to the school of fish 172 above the straight line 173. In the upper quarter of the lower half portion of the display screen, there is provided a display of the information of the area above the net monitor. That is, a display 175 indicating the position of the net monitor and a display 176 of the school of fish are provided. And in the lower quarter, the sea bottom and the school of fish are displayed based on the information of the area below the net monitor, as indicated by 177 and 178, respectively.

As described above, according to the fish-finder of this invention, since the reflected signals are displayed in different colors corresponding to their individual levels, the level differences appear distinctly to provide for remarkedly enhanced resolution, as compared with resolution of shaded images formed on the recording paper in the prior art. Especially, by selecting the colors to be displayed corresponding to the reflected signal levels, the school of fish can be displayed in a striking color. Further, since the displays are produced in the same form as the records obtained on the recording paper in the prior art, the displayed information is easy to analyze. Moreover, no recording paper is used; substantially no articles of consumption are used. Further, any part of the display can be magnified by the selection of the magnified position selecting switch 59 and the magnifying power can also be altered freely by the selection of the magnifying power selection switch 64.

In addition, a normal display and a partly magnified display can be provided side by side. Similarly, the information of the fish-finder and the information of the net monitor can also be displayed at the same time. Further, information can be displayed in various modes by selecting the selective read-out means 74 to 78, as described previously. In such a case, priority is given by the cascade connection of the selectors 99 of the selective read-out means and displays are provided in accordance with the priority levels. For example, in the embodiment illustrated in FIGS. 3 to 5, even if the selective read-out means are all in the selected state, it is dependent upon the set state of the first selective read-out means 74 whether the operations of the subsequent selective read-out means for reading and displaying data can be achieved. In other words, if the switch 92 of the first selective read-out mans 74 is set at the full-width display terminal a, the information from the other selective read-in means is not displayed regardless of whether these selective read-out means are selected or not. Further, in the case where the switch 92 of the selective read-out means 74 is connected to the half-width display terminal b, information from any one of the selective read-out means 75 to 78 or some combination of them is selectively displayed in accordance with the selected state of these selective read-out means. The determination of priority is not limited specifically to the above but can be selected as desired. Moreover, the amount of data to be displayed can be increased or decreased at will.

Figure 16:
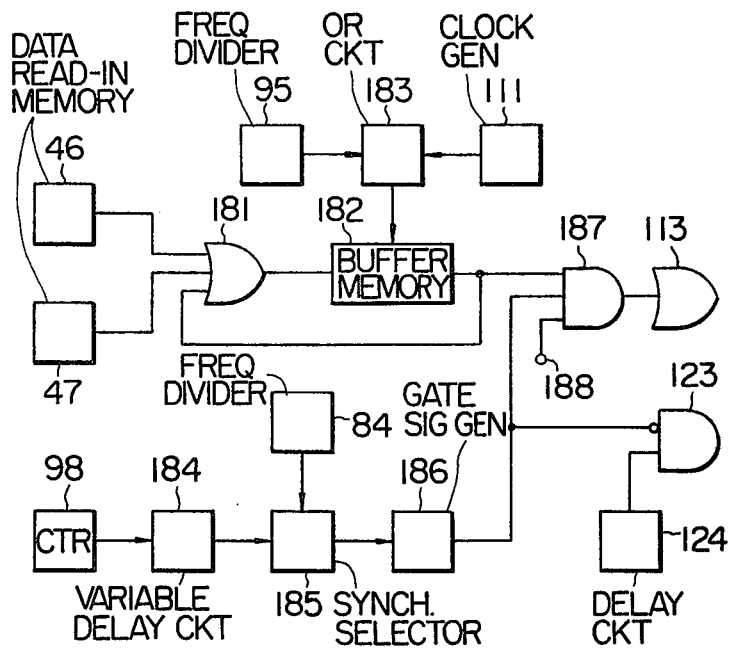
FIG. 16 is a block diagram showing the principal part of a circuit structure for displaying the position of the signal from the net monitor in a shifted position.

With the present invention, it is possible to display the information from the fish-finder, for example, in the upper half of the screen, and the information from the net monitor in the lower half, as described above in connection with FIG. 15. In this case, the transmitting-receiving transducer 23 of the fish-finder and the net monitor 41 are spaced a distance $L_1$ apart, as depicted in FIG. 7, but the information from both of them can be displayed on the screen at the same position by the operation of the structure shown in FIGS. 3 to 5. It is also possible to display the information on the screen at a distance corresponding to $L_1$. For example, as illustrated in FIG. 16, the output from the memories 46 and 47 for reading in the data of the areas above and below the net monitor 41 are supplied to a buffer memory 182 through an OR circuit 181 different from the OR circuit 94 used in FIGS. 3 to 5. Writing in the memory 182 is achieved by appling thereto the write pulse from the frequency divider 95 through an OR circuit 183 as in the case of writing in the buffer memory 79 in FIG. 5. As will be understood from the foregoing description, the information of the memories 46 and 47 are transferred to the buffer memory 182 in accordance with the selected state of the selective read-out means 74 to 78. On the other hand, in FIG. 5, the pulse indicative of completion of writing in the buffer memory 79 (FIG. 11A) is obtained from the counter 98, and also applied to a variable delay circuit 184 and delayed for a time $D_1$. This time $D_1$ is selected equal to the time necessary for the fishing boat 37 to sail the distance $L_1$ between the net monitor 41 and the transmitting-receiving transducer 23. The delay circuit 184 is constructed so that the delay time $D_1$ may be altered in accordance with the sailing speed of the fishing boat 37 and the length of the rope 38. The line synchronizing pulse (FIG. 11G) appearing immediately after the delayed pulse shown in FIG. 11F is selected by a synchronization selector 185, as shown in FIG. 11H. The output pulse from the synchronization selector 185 is applied to a gate signal generator 186 to drive it to provide a gate signal having a duration of one line scanning period, as depicted in FIG. 11I, which signal is applied to a gate circuit 187. The gate circuit 187 is supplied with the output from the buffer memory 182, the output from the gate signal generator 186 and a signal from a terminal 188 which is indicative of the information from the net monitor being selected. A signal indicative of this selection can be easily derived from the set position of each switch 92 of the selective read-out means 77 and 78. On the other hand, the pulse from the clock generator 111 is applied as a read pulse to the buffer memory 182 through the OR circuit 183 and the information in the buffer memory 182 is held to circulate. When the gate circuit 187 is opened by the gate signal depicted in FIG. 11I, the output from the buffer memory 182 is transferred to the main memory 81 through the gate circuit 187 and a gate circuit 113. In this case, as will be seen from the description given previously with regard to the selective read-out means 74 to 78, the buffer memory 182 has no signal in its first half area, and has stored in its second half area the information from the net monitor 41. In this manner described above, the information from the net monitor 41 is transferred to the main memory 81 after being delayed behind the information from the buffer memory 79 for the time $D_1$. Consequently, the information from the transmitting-receiving transducer 23 and the monitor 41 are displayed on the screen at a distance corresponding to the distance $L_1$, thus facilitating the analysis of the relationships between the both information.

Figure 17:
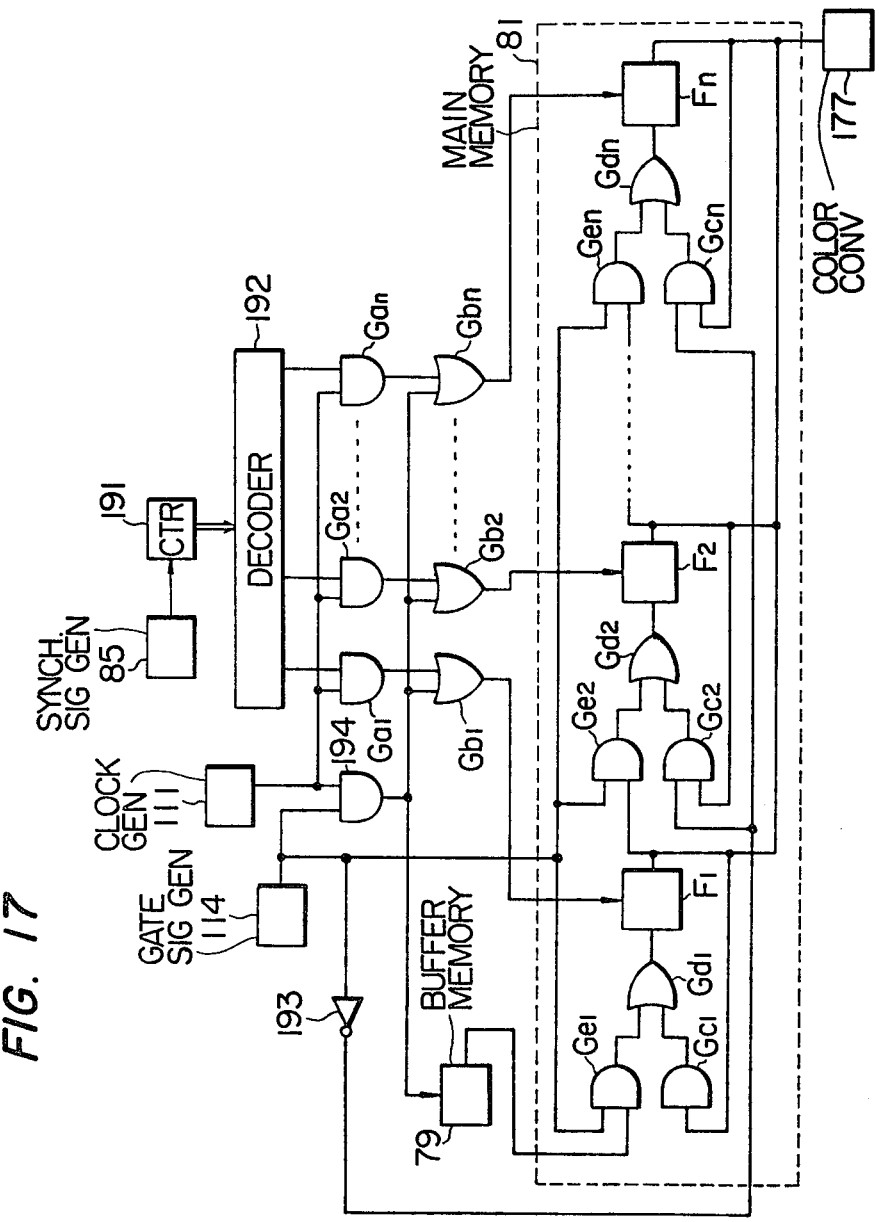
FIG. 17 is a block diagram illustrating another example of the main memory and its gate control circuit.

In FIGS. 1 and 3 to 5, the main memory 81 is formed by the series connection of the shift registers $F_1$ to $F_n$ and the data is circulated in the series connection but it is also possible to circulate the data in each of the shift registers $F_1$ to $F_n$. FIG. 17 illustrates an example of the latter case. In FIG. 17, the parts corresponding to those in FIGS. 3 to 5 are marked with the same reference numerals. The line synchronizing signal from the line synchronizing signal generator 85 is supplied to a counter 191, which reaches its full count with the number of scanning lines in the screen. The count content of the counter 191 is decoded by a decoder 192, from which gate pulses of a duration corresponding to the line scanning period are sequentially applied to gates $Ga1$ to $Gan$ every line scanning period. These gates $Ga1$ to $Gan$ are respectively supplied with the pulses from the clock generator 111 and the pulses supplied to the gates $Ga1$ to $Gan$ are applied as drive pulses to the shift registers $F_1$ to $F_n$ through OR gates $Gb1$ to $Gbn$, respectively. The outputs from the shift registers $F_1$ to $F_n$ are fed back to their first stages through gates $Gc1$ to $Gcn$ and gates $Ga1$ to $Gdn$, respectively, and, at the same time, applied as the output from the main memory 81 to the color matrix circuit 177. Accordingly, in the first line scanning of the frame scanning, the gate $Ga1$ is opened and the content of the shift register $F_1$ is derived from the main memory 81 and, at the same time, fed back to the shift register $F_1$. In the second line scanning, the gate $Ga2$ is opened and the content of the shift register $F_2$ is outputted from the main memory 81 and, at the same time, fed back to the register $F_2$. Thereafter, similar operations take place for each line scanning, and when the gate $Gan$ is opened to read out the shift register $F_n$, one frame scanning is completed and the gate $Ga1$ and the following ones are opened again one after another. In the case of writing in the main memory 81, gates $Ge1$ to $Gen$ are opened by the outputs from the gate signal generator 114 and the shift registers $F_1$ to $F_n$ are connected in series through the gates $Ge2$ to $Gen$ and $Gd2$ to $Gdn$, respectively. At this time, the output from the gate signal generator 114 is supplied to the gates $Gc1$ to $Gcn$ after being inverted by an inverter 193, closing these gates. Further, the output from the gate signal generator 114 is also applied to a gate 194, through which the clock pulse from the clock generator 111 are supplied to the buffer memory 79 and the gates $Gb1$ to $Gbn$, respectively, by which the shift registers $F_1$ to $F_n$ are also driven. As a result of this, the content of the buffer memory 79 is transferred to the shift register $F_1$, and the content of the shift register $F_1$ is transferred to the shift register $F_2$ and the content of each of the following shift registers is likewise transferred to the next-stage one.

Figure 18:
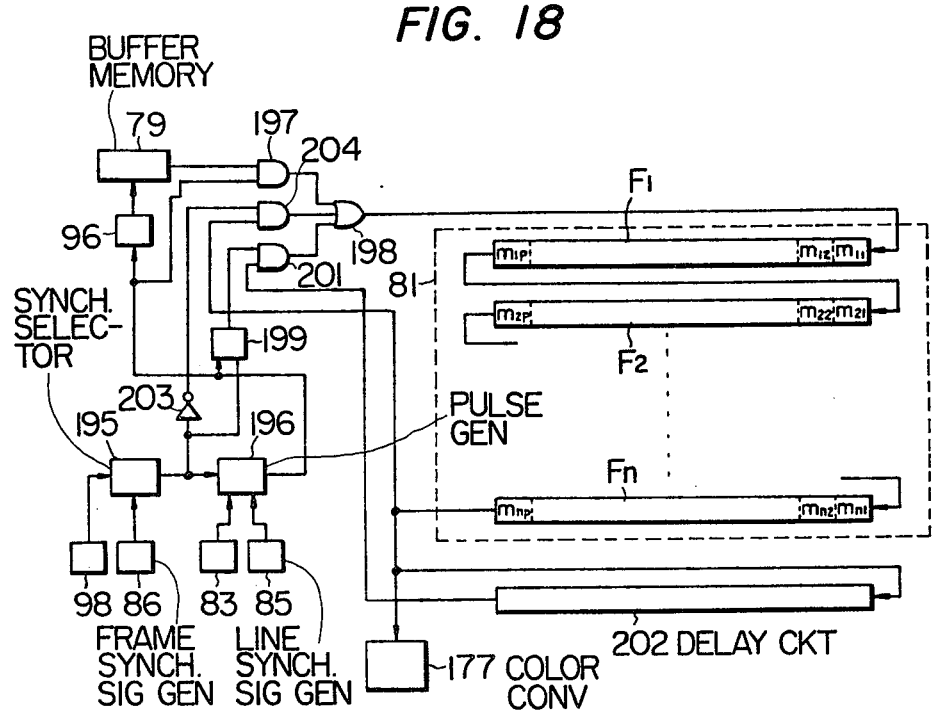
FIG. 18 is a block diagram showing another example of each of the main memory and the gate control circuit in the case of forming a display line in a direction perpendicular to a scanning line.
Figure 19:
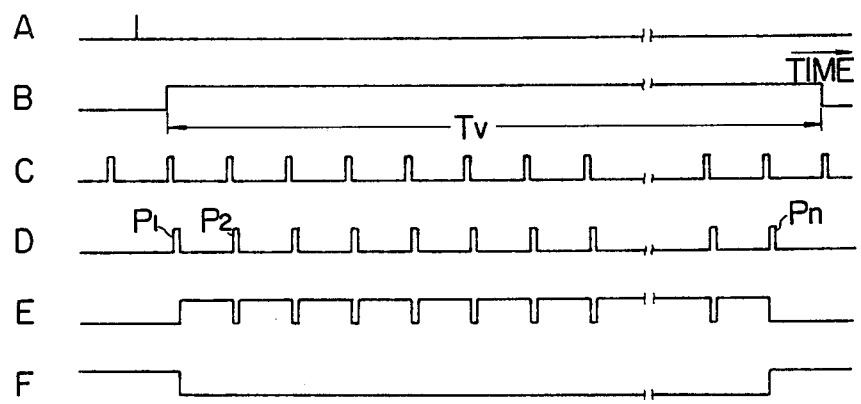
FIG. 19 shows a series of waveform diagrams explanatory of the operation of the circuit structure shown in FIG. 18.
Figure 20:
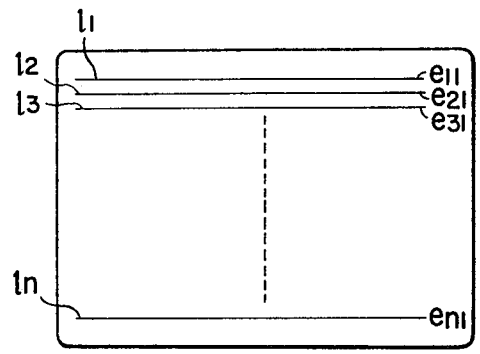
FIG. 20 is a diagram showing the process of displaying by the main memory depicted in FIG. 18.

In the above, one display line is provided in the form of one scanning line on the screen of the display 82, but may also be provided in a direction perpendicular to the scanning line. FIG. 18 illustrates the principal part of an example of the structure therefor, and the parts corresponding to those in FIGS. 3 to 5 are identified by the same reference numerals. A pulse indicative of completion of writing in the buffer memory 79 (FIG. 19A) is applied to a synchronization selector 195 to select a frame synchronizing signal which is applied thereto from the frame synchronizing signal generator 86 immediately after the abovesaid pulse, obtaining such a signal shown in FIG. 19B which has a duration corresponding to one frame scanning period $Tv$. This signal is supplied to a pulse generator 196 and, at the same time, the clock signal from the clock generator 111 and a line synchronizing signal (FIG. 19C) from the line synchronizing signal generator 85 are applied to the pulse generator 196, by which are selected clock pulses, each immediately following the line synchronizing signal pulse in the duration of the signal of FIG. 19B, as shown in FIG. 19D. By the clock pulses thus obtained, the buffer memory 79 is driven and, in a gate circuit 197, the output read out from the buffer memory 79 and the clock pulse from the pulse generator 196 are compared with each other for coincidence, and the output from the gate circuit 197 is written in a first stage $m_{11}$ of the shift register $F_1$ of the main memory 81 through an OR circuit 198. An inverted signal of the clock pulse from the pulse generator 196 is ANDed with the gate signal from the gate signal generator 155 in a circuit 199 to produce a gate signal shown in FIG. 19E, by which signal a gate circuit 201 is opened. The output from the main memory 81 is delayed by a delay circuit 202 for one line scanning period, and then fed back to the first stage of the shift register $F_1$ through the gate circuit 201 and the OR circuit 198. Consequently, a signal written by the first clock pulse $P_1$ (FIG. 19D) is transferred to a first stage $m_{21}$ of the second shift register $F_2$ when the content of the buffer memory 79 is written by the second clock pulse $P_2$ in the first stage $m_{11}$ of the main memory 81. When the content of the buffer memory 79 is written by the last clock pulse $P_n$ in the main memory 81, the content by the clock pulse $P_1$ is transferred to a first stage $m_{n1}$ of the last shift register $F_n$. Upon completion of this writing, the gate circuits 197 and 201 are closed and, by a signal from an inverter 203 supplied with the gate signal from the circuit 195, a gate 204 is opened to permit the passage therethrough of the output from the main memory 81 to feed it back to the first stage $m_{11}$ of the memory 81 through the OR circuit 204. In this circulation holding state, the contents $e_{11}, e_{21} \ldots e_{nl}$ stored at the storage stages $m_{11}, m_{21} \ldots m_{nl}$ of the main memory 81 at the initial state are each displayed at one end of each of the scanning lines $l_1, l_2 \ldots l_n$ on the screen of the display 82, as illustrated in FIG. 20. Next, when data are similarly written in the main memory 81, the contents stored at the first stages of the shift registers $F_1$ to $F_n$ at the initial state are respectively transferred to the second stages $m_{12}, m_{22} \ldots m_{n2}$ and, on the screen, the contents are respectively shifted a distance of one picture element to the left on the scanning line in FIG. 20. In this manner, a display is provided by display lines perpendicular to the scanning line.

Figure 21:
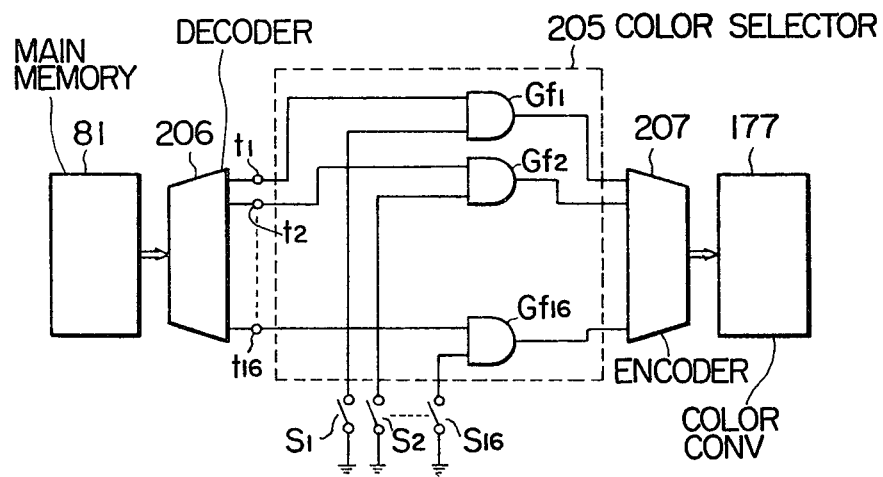
FIG. 21 is a circuit diagram illustrating an example of a color selector circuit.

By displaying, on the display, received reflected signals in colors different with their levels, small level differences can also be discerned clearly. In this case, it is also possible to selectively remove the colors of unnecessary components from the display on the screen so as to ensure more accurate analysis of the displayed picture. To perform this, for example, as illustrated in FIG. 21, a color selector 205 is inserted between the main memory 81 and the color matrix circuit 177 and the output from the main memory 81, for instance, a 4-bit binary digital signal, is decoded by a decoder 206 to derive an output at one of its output terminals $t_1$ to $t_{16}$ in accordance with the magnitude of the digital signal. The outputs at the terminals $t_1$ to $t_{16}$ are respectively supplied to gate circuits G/1 to G/16 in the color selector 205 and the other inputs of the gate circuits G/1 to G/16 are grounded through switches $S_1$ to $S_{16}$, respectively. The outputs from the gate circuits G/1 to G/16 are supplied to an encoder 207 and converted into a 4-bit binary digital signal again, which is applied to the color matrix circuit 177. For example, at the initial state, the switches $S_1$ to $S_{16}$ are all turned on to open all of the gate circuits G/1 to G/16, that is, the output from the main memory 81 is applied as it is to the color matrix circuit 177, and based on observation of the display on the screen, one or more of the switches $S_1$ to $S_{16}$ are selectively turned off to eliminate those levels in the received signal corresponding to a shoal of plankton, thereby enabling an accurate display of fish in the shoal of plankton. Further, when the operator has got used to such an operation, he can immediately obtain a display easy of accurate interpretation by turning on those of the switches $S_1$ to $S_{16}$ which correspond to components of unnecessary levels in the received reflected signal.

In order to prevent that the both ends of the screen of the display 32 are covered with a mask, the following step is taken. That is, for example, in FIGS. 3 to 5, when the switch 92 of each selective read-out means is set at the full width position a, the output pulse from the frequency divider 89 is made a little higher in speed than the output pulse from the frequency divider 95, by which, for instance, when the data of all the data read-in memories 34 are written in the buffer memory 79, the buffer memory 79 is filled up to about 90% of its capacity. Also, covering of the upper and lower or right and left ends of the screen with the mask can be prevented by slightly extending the suspension period of the clock pulse in the clock generator 111.

In the case of providing a display on a color display located at a remote place, the received signal and the transmission triggering signal from the transmitter-receiver unit 11 are transmitted as electric waves, and received and processed in the same manner as described above. It is also possible to provide a display on the color display at the remote place by transmitting, as electric waves, the various synchronizing signals from the control circuit 7 and the respective color signals from the color converter 177, for example, in FIG. 1. In this case, if the abovesaid signals are transmitted in the form of signals of the same system as the color television broadcasting system, a television receiver for receiving the color television broadcasting signal can be employed as the display 82. That is, the color signals of the color converter are produced corresponding to the outputs from a three primary color camera, and a luminance signal and a color difference signal are derived from the color signals and the synchronizing signal of the control circuit 7, and a color subcarrier is produced, and then these signals are transmitted as the so-calld NTSC signals.

It will be apparent that many modifications and variations may be effected without departing from the scope of novel concepts of this invention.

What is claimed is:

1. A fish-finder comprising:
   a transmitter-receiver unit for periodically emitting an ultrasonic pulse into the water and receiving its reflected wave, the transmitter-receiver unit including a reference oscillator, a frequency divider for frequency dividing the oscillation output from the reference oscillator, a range switch for selectively changing the frequency dividing ratio of the frequency divider in accordance with the detection range adopted and means for deriving a transmission pulse from the output from the frequency divider;
   an A-D converter connected to the transmitter-receiver unit for converting the received reflected wave into a digital signal;
   a main memory supplied with the digital signal, having a storage capacity of one picture frame and repeatedly read out;
   a color converter supplied with the output from the main memory to convert it into a color signal corresponding to the value of the output digital signal;
   a color cathode ray tube display supplied with the color signal;
   a normal display data read-in memory supplied with the output from the A-D converter before it is supplied to the main memory and having a capacity corresponding to the number of picture elements of one display line of the color cathode ray tube display;
   a data write pulse generator supplied with the output from the frequency divider to change the output frequency in accordance with the setting of the range switch and generate write pulses of the same number as the picture elements of one display line, thereby controlling data writing in the data read-in memory; and
   control means for transferring the digital signal from the read-in memory to the main memory so that the digital signal is displayed in the form of one display line at a predetermined position of the screen of the color cathode ray tube display and display lines provided until they are each shifted to the older display line to remove the oldest display line.

2. A fish-finder according to claim 1, which further includes a counter for counting the output from the frequency divider to provide outputs sequentially phased apart but having the same frequency, and a shift switch for selecting one of the outputs from the counter to start the write pulse generator.

3. A fish-finder according to claim 1, which further includes magnified position selecting switch for selecting output pulses, each corresponding to one moment during data reading in the normal display data read-in memory, a partly magnifying pulse generator started by a pulse corresponding to the setting of the magnified position selecting switch and frequency dividing the output from the reference oscillator to generate a pulse at least several times as fast as the pulse from the data read-in pulse generator, and a partly magnifying data read-in memory driven by the magnifying pulse to read therein the output from the first A-D converter.

4. A fish-finder according to claim 3, which further includes a magnifying power selecting switch for changing the pulse frequency of the partly magnifying pulse generator.

5. A fish-finder according to claim 1, which further includes a bottom magnifying pulse generator for frequency dividing the output from the reference oscillator to generate a pulse at least several times as fast as the pulse from the data read-in pulse generator, a bottom magnifying data read-in memory driven by the bottom magnifying pulse to read therein the output from the first A-D converter and having a capacity corresponding to the number of picture elements of one display line, a bottom signal detector for detecting from the received signal a bottom signal reflected from the bottom of water, and means for stopping the operation of the bottom magnifying data read-in memory by the bottom signal.

6. A fish-finder according to claim 5, which further includes a magnifying power selecting switch for changing the output frequency of the bottom magnifying pulse generator.

7. A fish-finder according to claim 3, which further includes a bottom magnifying pulse generator for frequency dividing the output from the reference oscillator to generate a pulse at least several times as the pulse from the data read-in pulse generator, a bottom magnifying data read-in memory driven by the bottom magnifying pulse to read therein the output from the first A-D converter and having a capacity corresponding to the number of picture elements of one display line, a bottom signal detector for detecting from the received signal a bottom signal reflected from the bottom of water, means for stopping the reading operation of the bottom magnifying data read-in memory by the bottom signal, a buffer memory for writing therein the data from the normal display data read-in memory, the partly magnifying data read-in memory and the bottom magnifying data read-in memory, the buffer memory having a capacity corresponding to the number of picture elements of one display line, and selecting means for compressing and transferring the data from one or more of the data read-in memories to the buffer memory.

8. A fish-finder according to claim 7, which further includes a second A-D converter for converting a received signal from a net monitor into a digital signal, and a net monitor data read-in memory for reading in the output from the second A-D converter.

9. A fish-finder according to claim 8, wherein the selecting means includes selective read-out means, each provided for each of the data read-in memories, and wherein the selective read-out means each comprises a display width selecting switch indicating the length of display on the display line and whether or not to read in the data from the data read-in memory, a read pulse generator for generating a pulse of a frequency corresponding to the selection of the selecting switch to read out the data read-in memory corresponding thereto, and selecting circuits sequentially connected in cascade, each of the selecting circuits supplying a read completion signal of the read pulse generator as a start signal to the selecting circuit of the next stage and, when not selected, passing therethrough the input signal as it is.

10. A fish-finder according to claim 1, which further includes a depth mark generator for frequency dividing the output from the frequency divider to periodically apply a digital signal of a specific level as a depth mark to the normal display data read-in memory.

11. A fish-finder according to claim 3, which further includes a magnifying position indicating signal generator for applying a digital signal of a specific level as a magnifying position mark signal to the normal display data read-in memory at the beginning and end of the operation of the partly magnifying pulse generator.

12. A fish-fnder according to claim 9, which further includes a boundary mark generator for applying a digital signal of a specific level as a boundary mark to the buffer memory at the time of completion of each of the read pulse generators.

13. A fish-finder according to claim 1, which further includes a time mark generator for frequency dividing the output from an oscillator for generating a line synchronizing signal for the color cathode ray tube display to apply a digital signal of a specific level as a time mark to the main memory.

14. A fish-finder according to claim 1, which further includes a color selector inserted between the main memory and the color converter for selectively connecting or disconnecting a digital signal or signals indicative of one or more specific levels in the main memory.

15. A fish-finder according to claim 1, wherein the color cathode ray tube display is provided at a place remote from the transmitter-receiver unit, and wherein the output from the color converter is supplied to a color television transmitter and the color television signal from the transmitter is received by a color television receiver having the color cathode ray tube display.

16. A fish-finder comprising:
a transmitter-receiving unit for periodically emitting an ultrasonic pulse into the water and receiving its reflected wave;
an A-D converter connected to the transmitter-receiver unit for converting the received reflected wave into a digital signal;
a main memory supplied with the digital signal, having a storage capacity of one picture frame and repeatedly read out, said main memory comprising shift registers;
a color converter supplied with the output from the main memory to convert it into a color signal corresponding to the value of the output digital signal;
a color cathode ray tube display supplied with the color signal; and
control means for transferring the digital signal from the A-D converter to the main memory so that the digital signal is displayed in the form of one display line at a predetermined position of the screen of the color cathode ray tube display and display lines provided until then are each shifted to the older display line to remove the oldest display line, said control means comprising a first gate opened by a frame synchronizing signal of the color cathod ray tube display immediately following a write designation for one line scanning period to supply data to the main memory, a delay circuit connected to the output of the main memory for delaying the output signal therefrom for one line scanning period, a second gate opened by the next frame synchronizing signal after closing of the first gate to feed back the delayed output to the main memory, a third gate closed in the period of opening of either one of the first and second gates and opened in the other periods to feed back the output of the main memory to its input side, and a control circuit for producing control gate signals for the first to third gates.

17. A fish-finder comprising:
a transmitter-receiver unit for periodically emitting an ultrasonic pulse into the water and receiving its reflected wave;
an A-D converter connected to the transmitter-receiver unit for converting the received reflected wave into a digital signal;
a main memory supplied with the digital signal, having a storage capacity of one picture frame and repeatedly read out;
a color converter supplied with the output from the main memory to convert it into a color signal corresponding to the value of the output digital signal;
a color cathode ray tube display supplied with the color signal; and
control means for transferring the digital signal from the A-D converter to the main memory so that the digital signal is displayed in the form of one display line at a predetermined position of the screen of the color cathode ray tube display and display lines provided until then are each shifted to the older display line to remove the oldest display line;
said main memory comprising shift registers of the same number as scanning lines of the screen of the color cathode ray tube display, each of said shift registers having a capacity corresponding to the number of picture elements of one scanning line, said control means comprising first a plurality of gates provided respectively at the input sides of said shift registers of the main memory and serving to couple the output from the shift register of a preceding stage to the shift register of the following state to supply new write data to the first-stage shift register, a second plurality of gates for feeding back the outputs from the shift registers to their inputs except in the period of writing in the main memory, and a control circuit for opening all of said first plurality of gates in the writing to drive all of the shift registers for a period of time corresponding to the picture elements of one scanning line and, except the write operation, driving the shift registers one after another for the period of time corresponding to the picture elements of one scanning line and sequentially opening the corresponding ones of said first plurality of gates.

18. A fish-finder comprising:
a transmitter-receiver unit for periodically emitting an ultrasonic pulse into the water and receiving its reflected wave;
an A-D converter connected to the transmitter-receiver unit for converting the received reflected wave into a digital signal;
a main memory supplied with the digital signal, having a storage capacity of one picture frame and repeatedly read out, said main memory comprising shift registers;
a color converter supplied with the output from the main memory to convert it into a color signal corresponding to the value of the output digital signal;
a color cathode ray tube display supplied with the color signal; and
control means for transferring the digital signal from the A-D converter to the main memory so that the digital signal is displayed in the form of one display line at a predetermined position of the screen of the color cathode ray tube display and display lines provided until then are each shifted to the older display line to remove the oldest display line, said control means comprising a first gate for feeding back the output from the control means to its input, a second gate for supplying write data to the main memory, a delay circuit for delaying the output from the main memory for a period of time corresponding to one scanning line, a third gate for feeding back the output from the delay circuit to the main memory, and a control circuit for generating control signals for opening the second gate for a period of time of a first picture element of each scanning line in one frame scanning period following write instructions for the main memory, opening the third gate in the remaining line scanning period and opening the first gate in the period except these periods, and closing all of said gates in the other periods.

19. A fish-finder comprising:
a transmitter-receiver unit for periodically emitting an ultrasonic pulse into the water and receiving its reflected wave;
a first A-D converter connected to the transmitter-receiver unit for converting the received reflected wave into a digital signal;
a second A-D converter for converting a received signal from a net monitor into a digital signal;
a main memory supplied with said digital signals, having a storage capacity of one picture frame and repeatedly read out;
a color converter supplied with the output from the main memory to convert it into a color signal corresponding to the value of the output digital signal;
a color cathode ray tube display supplied with the color signal; and
control means for transferring the digital signal from the first A-D converter to the main memory so that the digital signal is displayed in the form of one display line at a predetermined position of the screen of the color cathode ray tube display and display lines provided until then are each shifted to the older display line to remove the oldest display line, said control means including means for transferring the data from the first and second A-D converters to the main memory to display the data from the first A-D converter in the first half of one display line of the color cathode ray tube display and the data from the second A-D converter in the latter half of the display line.

20. A fish-finder according to claim 19, which further includes a memory for temporarily storing the output from the second A-D converter, and means for transferring the data from the temporarily storing to the main memory behind the data transfer from the first A-D converter to the main memory.

21. A fish-finder comprising:

a transmitter-receiver unit for periodically emitting an ultrasonic pulse into the water and receiving its reflected wave;

an A-D converter connected to the transmitter-receiver unit for converting the received reflected wave into a digital signal;

a main memory supplied with the digital signal, having a storage capacity of one picture frame and repeatedly read out, said main memory being entirely electronic and devoid of mechanical moving parts;

a color converter supplied with the digital signal read out of the main memory to convert it into one of at least four color signals in accordance with the value of the output digital signal;

a color cathode ray tube display supplied with said color signals; and control means for transferring the digital signal from the A-D converter to the main memory so that the digital signal is displayed in the form of one display line at a predetermined position of the screen of the color cathode ray tube display and display lines provided until then are each shifted to the older display line to remove the oldest display line.

* * * * *

UNITED STATES PATENT AND TRADEMARK OFFICE
CERTIFICATE OF CORRECTION

PATENT NO. : 4,104,609
DATED : August 1, 1978
INVENTOR(S) : Yukihiko Minegishi, Shokichi Sato and Toshikazu Yamada It is certified that error appears in the above-identified patent and that said Letters Patent are hereby corrected as shown below:

In the Heading please insert the following:

[73] Assignee: Kabushiki Kaisha Koden Seisakusho of Tokyo, Japan

Signed and Sealed this

First Day of May 1979

[SEAL]

Attest:

RUTH C. MASON
Attesting Officer

DONALD W. BANNER
Commissioner of Patents and Trademarks